US011919027B2

(12) United States Patent
Pitera et al.

(10) Patent No.: US 11,919,027 B2
(45) Date of Patent: Mar. 5, 2024

(54) MODULAR SPRAY GUN LID ASSEMBLIES AND METHODS OF DESIGN AND USE

(71) Applicant: 3M INNOVATIVE PROPERTIES COMPANY, St. Paul, MN (US)

(72) Inventors: Dominic M. Pitera, San Francisco, CA (US); Stephen C. P. Joseph, Woodbury, MN (US); Scott D. Gullicks, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 102 days.

(21) Appl. No.: 17/308,211

(22) Filed: May 5, 2021

(65) Prior Publication Data

US 2021/0252536 A1 Aug. 19, 2021

Related U.S. Application Data

(63) Continuation of application No. 16/069,820, filed as application No. PCT/US2017/013118 on Jan. 12, 2017, now Pat. No. 11,040,361.

(60) Provisional application No. 62/279,300, filed on Jan. 15, 2016.

(51) Int. Cl.
*B05B 7/24* (2006.01)

(52) U.S. Cl.
CPC .......... *B05B 7/2478* (2013.01); *B05B 7/2408* (2013.01)

(58) Field of Classification Search
CPC ............................ B05B 7/2478; B05B 7/2408
USPC ............................................................... 239/1
See application file for complete search history.

(56) References Cited

U.S. PATENT DOCUMENTS

| | | | |
|---|---|---|---|
| 1,395,965 | A | 11/1921 | McLean et al. |
| 1,732,691 | A | 4/1927 | Mueller et al. |
| 1,968,173 | A | 7/1934 | Russell |
| 2,004,574 | A | 6/1935 | Gee, Jr. |
| 2,037,240 | A | 4/1936 | Johnson |
| 3,083,883 | A | 4/1963 | Glidden |
| D200,960 | S | 4/1965 | Beinert |
| 3,271,059 | A | 9/1966 | Pearson |
| 3,401,842 | A | 9/1968 | Morrison |
| D217,609 | S | 5/1970 | Vicknair et al. |
| 3,942,680 | A | 3/1976 | Seeley et al. |
| D252,156 | S | 6/1979 | Tabony et al. |
| 4,430,084 | A | 2/1984 | Deaton |

(Continued)

FOREIGN PATENT DOCUMENTS

| | | |
|---|---|---|
| CA | 2466801 | 12/2004 |
| CN | 204710607 | 10/2015 |

(Continued)

OTHER PUBLICATIONS

DeKups Disposable Paint Cup System by DeVilbiss, Oct. 9, 2012, Product Video, <*DeKups Disposable Paint Cup System by DeVilbiss (English)—YouTube*>, available on the internet.

(Continued)

*Primary Examiner* — Chee-Chong Lee
(74) *Attorney, Agent, or Firm* — Jonathan V. Sry

(57) ABSTRACT

A spray gun cup lid is disclosed comprising a modular lid base and a modular liquid outlet that is formed independently of the modular lid base and is connected at an interface to the modular lid base. The modular liquid outlet comprises an outlet connection member to allow connection to a compatible spray gun.

10 Claims, 32 Drawing Sheets

(56) References Cited

U.S. PATENT DOCUMENTS

| | | | |
|---|---|---|---|
| 4,858,777 A | 8/1989 | Morel | |
| D315,781 S | 3/1991 | Hart et al. | |
| 5,150,804 A | 9/1992 | Blanchet et al. | |
| 5,240,133 A | 8/1993 | Thomas, Jr. | |
| 5,611,443 A | 3/1997 | King | |
| 5,816,501 A | 10/1998 | LoPresti et al. | |
| 6,053,429 A | 4/2000 | Chang | |
| 6,092,740 A * | 7/2000 | Liu | B05B 7/2478 285/190 |
| 6,302,445 B1 * | 10/2001 | Kugele | F16L 47/28 285/376 |
| 6,375,031 B1 | 4/2002 | Kwan | |
| 6,435,426 B1 | 8/2002 | Copp, Jr. | |
| 6,536,687 B1 * | 3/2003 | Navis | B05B 7/2478 239/350 |
| 6,547,161 B1 | 4/2003 | Huang | |
| D474,528 S | 5/2003 | Huang | |
| 6,588,681 B2 | 7/2003 | Rothrum et al. | |
| 6,595,441 B2 | 7/2003 | Petrie et al. | |
| 6,662,411 B2 | 12/2003 | Rubenstein et al. | |
| 6,938,836 B2 | 9/2005 | Bouic | |
| 6,953,155 B2 | 10/2005 | Joseph et al. | |
| 7,032,839 B2 | 4/2006 | Blette et al. | |
| 7,036,752 B1 | 5/2006 | Hsiang | |
| 7,080,750 B2 | 7/2006 | Wein | |
| 7,083,119 B2 | 8/2006 | Bouic et al. | |
| 7,188,785 B2 | 3/2007 | Joseph | |
| D542,376 S | 5/2007 | Blette et al. | |
| 7,353,973 B2 | 4/2008 | Rohr | |
| D574,926 S | 8/2008 | Huang | |
| 7,410,106 B2 | 8/2008 | Escoto, Jr. et al. | |
| 7,416,140 B2 | 8/2008 | Camilleri et al. | |
| 7,513,443 B2 | 4/2009 | Escoto, Jr. et al. | |
| D607,807 S | 1/2010 | Ohlhorst | |
| 7,694,896 B2 | 4/2010 | Turnbull et al. | |
| D616,961 S | 6/2010 | Goetz | |
| 7,789,324 B2 | 9/2010 | Bouic et al. | |
| 7,819,341 B2 | 10/2010 | Schmon et al. | |
| D640,587 S | 6/2011 | Tanaka | |
| D642,863 S | 8/2011 | Tobias | |
| 8,016,209 B2 | 9/2011 | Hess et al. | |
| 8,033,413 B2 | 10/2011 | Gerson et al. | |
| 8,066,205 B2 | 11/2011 | Bass et al. | |
| D656,583 S | 3/2012 | Hudson, Jr. et al. | |
| 8,127,963 B2 | 3/2012 | Gerson et al. | |
| 8,196,770 B2 | 6/2012 | Kosmyna et al. | |
| D679,146 S | 4/2013 | Rincon | |
| 8,444,067 B2 | 5/2013 | Schmon | |
| D692,530 S | 10/2013 | Gehrung | |
| 8,590,809 B2 | 11/2013 | Escoto, Jr. et al. | |
| D697,583 S | 1/2014 | Schmon et al. | |
| D705,899 S | 5/2014 | Abernethy et al. | |
| 8,844,840 B2 | 9/2014 | Lawrence | |
| 8,857,649 B2 | 10/2014 | Buchholz | |
| D717,104 S | 11/2014 | Redfern | |
| D719,637 S | 12/2014 | Pagliai | |
| 8,925,836 B2 | 1/2015 | Dettlaff et al. | |
| 8,944,351 B2 | 2/2015 | Pellegrino et al. | |
| 8,998,018 B2 | 4/2015 | Pellegrino et al. | |
| 9,038,674 B2 | 5/2015 | Steele | |
| D739,242 S | 9/2015 | Pitera et al. | |
| 9,162,240 B2 | 10/2015 | Gerson et al. | |
| 9,174,231 B2 | 11/2015 | Shultz | |
| D747,497 S | 1/2016 | Bell | |
| 9,227,208 B2 | 1/2016 | Lin | |
| D755,345 S | 5/2016 | Lüthi | |
| D755,575 S | 5/2016 | Pratt | |
| 9,335,198 B2 | 5/2016 | Pellegrino et al. | |
| D758,533 S | 6/2016 | Dettlaff | |
| 9,358,561 B2 | 6/2016 | Johnson et al. | |
| D779,632 S | 2/2017 | Johnson et al. | |
| 9,586,220 B2 | 3/2017 | Pellegrino et al. | |
| D792,556 S | 7/2017 | Hegdahl et al. | |
| D793,530 S | 8/2017 | Hegdahl et al. | |
| D793,531 S | 8/2017 | Hegdahl et al. | |
| 9,815,076 B2 | 11/2017 | Schulz et al. | |
| 2003/0006310 A1 | 1/2003 | Rothrum et al. | |
| 2003/0198502 A1 | 10/2003 | Maloney et al. | |
| 2004/0256484 A1 | 12/2004 | Joseph | |
| 2005/0092770 A1 | 5/2005 | Yechouron | |
| 2005/0139621 A1 | 6/2005 | Foster | |
| 2005/0156058 A1 | 7/2005 | Kosmyna et al. | |
| 2006/0000927 A1 | 1/2006 | Ruda | |
| 2006/0017286 A1 | 1/2006 | Kosmyna | |
| 2006/0175433 A1 | 8/2006 | Escoto, Jr. et al. | |
| 2006/0196891 A1 | 9/2006 | Gerson et al. | |
| 2006/0251473 A1 | 11/2006 | Tyski | |
| 2007/0158348 A1 | 7/2007 | Kosmyna et al. | |
| 2007/0158361 A1 | 7/2007 | Koyama | |
| 2007/0272323 A1 | 11/2007 | Verhaeghe | |
| 2008/0011879 A1 | 1/2008 | Gerson et al. | |
| 2008/0223087 A1 | 9/2008 | Veldman | |
| 2009/0200309 A1 | 8/2009 | Kosmyna | |
| 2010/0288772 A1 | 11/2010 | Wambeke et al. | |
| 2010/0288787 A1 | 11/2010 | Jäckel | |
| 2011/0108579 A1 | 5/2011 | Martorell Pena et al. | |
| 2012/0000992 A1 | 1/2012 | Shih | |
| 2012/0273583 A1 | 11/2012 | Gerson et al. | |
| 2012/0280062 A1 | 11/2012 | Pellegrino | |
| 2012/0282009 A1 | 11/2012 | Geuther | |
| 2012/0291890 A1 | 11/2012 | Pan | |
| 2013/0001322 A1 | 1/2013 | Pellegrino et al. | |
| 2013/0105598 A1 | 5/2013 | Shultz et al. | |
| 2013/0153683 A1 | 6/2013 | Lawrence | |
| 2013/0186981 A1 | 7/2013 | Burns | |
| 2013/0221130 A1 | 8/2013 | Joseph et al. | |
| 2014/0014741 A1 | 1/2014 | Escoto, Jr. et al. | |
| 2014/0103143 A1 | 4/2014 | Lin | |
| 2014/0178126 A1 | 6/2014 | Burns | |
| 2014/0203098 A1 | 7/2014 | Bierie | |
| 2015/0060568 A1 | 3/2015 | Johnson et al. | |
| 2015/0108135 A1 | 4/2015 | Hanna | |
| 2015/0360812 A1 | 12/2015 | Gerson et al. | |
| 2016/0052002 A1 | 2/2016 | Schulz et al. | |
| 2016/0271632 A1 | 9/2016 | Bierie | |
| 2016/0303594 A1 | 10/2016 | Nyaribo et al. | |
| 2019/0009289 A1 | 1/2019 | Pitera et al. | |
| 2019/0015858 A1 | 1/2019 | Hegdahl et al. | |

FOREIGN PATENT DOCUMENTS

| | | |
|---|---|---|
| DE | 8902223.8 | 5/1989 |
| DE | 20202123 | 2/2003 |
| DE | 10315426 | 6/2004 |
| DE | 202004003116 | 7/2005 |
| DE | 102007039106 | 2/2009 |
| DE | 102009034715 | 1/2011 |
| EP | 1566223 | 8/2005 |
| EP | 2203256 | 7/2010 |
| EP | 2383044 | 11/2011 |
| EP | 2450108 | 5/2012 |
| EP | 2982443 | 2/2016 |
| JP | S48-014196 | 4/1973 |
| JP | S51-010078 | 1/1976 |
| JP | S57-181365 | 11/1982 |
| JP | S58-183456 | 10/1983 |
| JP | 3052058 | 9/1998 |
| NL | 1033999 | 2/2009 |
| WO | WO 94/16957 | 8/1993 |
| WO | WO 1998-32539 | 7/1998 |
| WO | WO 2002-085533 | 10/2002 |
| WO | WO 2003-045575 | 6/2003 |
| WO | WO 2004-037433 | 5/2004 |
| WO | WO 2004/052552 | 6/2004 |
| WO | WO 2005-018815 | 3/2005 |
| WO | WO 2007-149760 | 12/2007 |
| WO | WO 2008/156357 | 12/2008 |
| WO | WO 2009/090273 | 7/2009 |
| WO | WO 2011/047876 | 4/2011 |
| WO | WO 2013-063231 | 5/2013 |
| WO | WO 2014/182722 | 11/2014 |
| WO | WO 2014-182871 | 11/2014 |
| WO | WO 2015-084617 | 6/2015 |
| WO | WO 2016/081977 | 6/2016 |

(56) References Cited

FOREIGN PATENT DOCUMENTS

| | | |
|---|---|---|
| WO | WO 2017-007911 | 1/2017 |
| WO | WO 2017-123708 | 7/2017 |
| WO | WO 2017-123709 | 7/2017 |
| WO | WO 2017-123714 | 7/2017 |
| WO | WO 2017-123715 | 7/2017 |
| WO | WO 2017-123718 | 7/2017 |
| WO | WO 2018-109594 | 6/2018 |

OTHER PUBLICATIONS

International Search Report for PCT International Application No. PCT/US2017/013121, dated Jun. 13, 2017, 9 pages.
Extended European Search Report for Application No. EP21156243, dated Jun. 9, 2021.
Photograph of Otto House Product; dated 2013.
"Paint & Solvent Solutions", Rummy Recycling Technologies Inc., Brochure, 2004, pp. 1-5.
Graco, "CanConnect-Handheld 1 Quart Can Adapter," Feb. 2014, pp. 1-2.
Graco, "XFORCE HD, Heavy Duty Cordless Airless Sprayer Optimized for Protective and Marine Coatings", 2012, pp. 1-4.
Gunner Cup by DeVilbiss, Service Instruction, 803442/DMK-1500 Conversion Adapter, 1 page, 2011.
Yotoriyama "Coating with Paint of Partner," pages from catalog, 2000.
Kenna, L.A., Eccentricity in Ellipses, Mathematics Magazine, vol. 32, No. 3, pp. 133-135, Jan.-Feb. 1959.
Rummy Recycling Technologies Inc., "Paint & Solvent Solutions" Photograph, scanned in Feb. 2006.
Rummy Recycling Technologies Inc., "Paint & Solvent Solutions" brochure with price list, 2004.
Hegdahl et al., U.S. Appl. No. 62/279,292, Spray Gun Cups, Receptacles, lids and Methods of Use,: filed Jan. 15, 2016.
Ebertowski et al., U.S. Appl. No. 62/279,537, "Button-Lock Fluid Connector for Hand-Held Spray Guns," filed Jan. 15, 2016.
International Search Report for PCT International Application No. PCT/US2017/013118, dated Apr. 25, 2017, 4 pages.

* cited by examiner

MODULAR SPRAY GUN LID ASSEMBLIES AND METHODS OF DESIGN AND USE

BACKGROUND

Liquid spray guns are commonly used to spray coatings such as stains, primers, paints, sealers and the like onto surfaces. It is known to provide a liquid spray gun with a paint cup that contains the liquid to be sprayed. The paint cup may include a lid for connection to a spray gun. There is a need for improved paint cups, components thereof including lids, and methods of design and use of the same.

SUMMARY

It has been observed that paint cups and their components have a tendency to become coated in paint when used in their typical environments (e.g., in the mixing room of an automotive collision repair shop). This coating of paint can present practical difficulties for the painter. For example, even though a paint cup may be transparent when purchased (in order to permit viewing of the contents of the cup), viewing the contents is eventually made difficult or impossible due to the build-up of dried paint. In particular, in order to facilitate mixing of the correct measurements of components of the paint or other substances, transparent paint cup systems often include a mix ratio gauge that is visible from the exterior of the cup. The mix ratio gauge may be a separate insert, or it may be displayed on the paint cup itself. To combat the buildup of paint and maintain visibility of the mix ratio gauge, a painter is required to either use solvent to clean the paint cup, or purchase a new one. If the painter is then forced to purchase a new cup to replace the contaminated one, a significant amount of plastic material may need to be discarded, and the cost of a new cup may be significant.

The present disclosure relates to improved spray gun cups, spray gun cup receptacles, and methods of using the same. In certain embodiments, less material can be used to manufacture the spray gun cup receptacle, thereby leading to a spray gun cup that is cheaper to manufacture, is lighter in use, and creates less waste upon disposal. Spray gun cup receptacles according to the present disclosure can also permit increased visibility of the contents of the spray gun cup through their sidewall, due to the provision of apertures therein. This can be particularly beneficial during paint mixing, when the painter may wish to view the levels of the various liquids added to the spray gun cup to ensure the proper volumes and/or ratios of components are used. Because the apertures cannot become coated with paint, the contents of the spray gun cup can continue to be easily viewed even if the remainder of the sidewalls become coated with paint.

Moreover, due to the nature and placement of a brace member in the sidewall of the spray gun cup receptacle, the brace member leaves a sufficient portion of the apertures non-occluded, such that the contents of the spray gun cup are visible at every height at from at least one viewing direction. In other words, if a painter wishes to ensure that the level of liquid in the spray gun cup is at a certain height, wherein that height is blocked from view by the brace member in one rotational position, the painter need only rotate the spray gun cup—or view the spray gun cup from another direction—until that height becomes visible. In this way, the painter can determine the precise liquid level of contents at any height, regardless of the opacity of the spray gun cup receptacle.

A spray gun cup receptacle according to some embodiments of the present disclosure can provide strength, rigidity, and structure during paint mixing. In some embodiments, the spray gun cup receptacle is left in place while spraying. In such embodiments, the spray gun cup receptacle can also provide strength, rigidity, and structure when connecting the spray gun cup to a spray gun, and in the painting processes itself. These benefits can be achieved while reducing the amount of raw material required for manufacture (as compared to a paint cup with a continuous wall).

In some embodiments, a spray gun cup may include a liner that can be inserted into the spray gun cup receptacle. In such cases, the spray gun cup receptacle may serve as an outer support cup.

In some embodiments, a spray gun cup may comprise a lid member that may optionally include an integrated filter. An integrated filter can eliminate the need for a separate filter by allowing a user to mix the paint within the paint cup itself (i.e., there is no need to transfer paint from another receptacle). Because the number of transfer steps is reduced, the amount of paint wasted is reduced. Examples of lid members and liners suitable for use in some embodiments of the present disclosure can be found in PCT Publication WO 1998/032539 to Joseph et al. (alternatively US Publication US 2004/0256484 A1, the disclosure of which is hereby incorporated by reference in its entirety).

Spray gun cups and spray gun cup receptacles according to the present disclosure can provide the necessary structure to withstand all typical forces in the use of the paint spray system. In the event that a portion of the spray gun cup receptacle blocks a the view of a portion of its contents, the receptacle, the liner, or the mix ratio gauge (where provided) may be rotated or otherwise adjusted to reveal any portion of the contents that was previously concealed by the spray gun cup receptacle. Visibility of the contents, while maintaining sufficient strength, rigidity, and structure as required throughout the mixing, connecting, and painting processes, are thus ensured.

Spray gun cups, receptacles, lids, and liners according to the present disclosure can further ease the assembly, use, disassembly, and cleanup compared to known systems. In some embodiments, the lid is able to connect directly to the receptacle without the need of an independent collar, and complementary connection features are provided on the lid and receptacle to assist in part alignment while at the same time speeding connection and reducing mistakes.

Moreover, embodiments according to the present disclosure can assist users in separating a liner from a lid to which the liner is securely sealed. The features disclosed herein can provide this functionality while also reducing the likelihood of rupturing the liner and/or causing paint spills.

Furthermore, some embodiments can provide improved tactile feedback to a user who is gripping an apertured receptacle to guide the user to avoid improperly pinching or squeezing a liner that is filled with paint, thus reducing the likelihood of costly spills.

Additional embodiments disclosed herein can increase flexibility and reduce cost in manufacturing of components (e.g., lids) for spray gun cups. For example, lids disclosed herein can be assembled from modular components, the benefits of which are more fully described below.

The present disclosure includes, but is not limited to, the following exemplary embodiments:

Embodiment 1: A spray gun cup receptacle comprising an open end for receiving a liner within a cavity;

a base end opposite the open end, the base end being positionable with respect to a work surface W with the open end facing upwards such that a base plane passing through the base end is parallel to the work surface;

a sidewall surrounding the cavity and connecting the open end to the base end, the sidewall comprising two apertures through which the cavity is visible from outside the spray gun cup receptacle, the two apertures being divided one above the other by a brace member, at least a portion of which is disposed at a brace member angle α relative to the base plane.

Embodiment 2: The spray gun cup receptacle of Embodiment 1 wherein the brace member angle α is sufficient to render the cavity visible through at least one of the two apertures at any vertical position within the cavity.

Embodiment 3: The spray gun cup receptacle of any of Embodiments 1 or 2 wherein the brace member defines a brace member trajectory T about the cavity, the brace member trajectory comprising a non-circular ellipse.

Embodiment 4: The spray gun cup receptacle of any of Embodiments 1-3 wherein the brace member angle α is at least 2 degrees.

Embodiment 5: The spray gun cup receptacle of any of Embodiments 1-4 wherein the brace member angle α is less than or equal to 30 degrees.

Embodiment 6: The spray gun cup receptacle of any of Embodiments 1-5 wherein the open end comprises receptacle connection structure to permit a lid member to be secured to the open end.

Embodiment 7: The spray gun cup receptacle of any of Embodiments 1-5 wherein the receptacle connection structure permits the lid member to be secured by one of: a threaded connection, a helical wedge connection, a snap-fit connection, a push-fit connection, a twist-lock connection, a clip connection, a strap connection, or combinations thereof.

Embodiment 8: The spray gun cup receptacle of any of Embodiments 1-7 wherein the sidewall comprises one or more generally vertical support members intersecting the brace member.

Embodiment 9: A spray gun cup comprising a spray gun cup receptacle according to any of Embodiments 1-8; and a liner positioned in the cavity, the liner comprising an open end corresponding to the open end of the spray gun cup receptacle.

Embodiment 10: The spray gun cup of Embodiment 9 comprising volumetric indicia V position to be visible through the apertures and indicate a volume of contents of the liner.

Embodiment 11: The spray gun cup of Embodiment 10 wherein the volumetric indicia are on the liner.

Embodiment 12: The spray gun cup of Embodiment 10 wherein the volumetric indicia are provided on an insert positioned between the spray gun cup receptacle and the liner.

Embodiment 13: The spray gun cup container of any of Embodiments 9-12 comprising a lid member secured to the open end of the spray gun cup receptacle.

Embodiment 14: The spray gun cup container of Embodiment 13 wherein the open end of the liner is secured by interaction of the lid member and the open end of the spray gun cup receptacle.

Embodiment 15: A method of using a spray gun cup comprising positioning a spray gun cup receptacle according to any of Embodiments 1-8 on a work surface;

inserting a liner into the open end of the spray gun cup receptacle;

adding a liquid to the liner; and viewing the level of the liquid through an aperture in the sidewall of the spray gun cup receptacle.

Embodiment 16: The method of Embodiment 15 comprising, prior to inserting the liner into the open end of the spray gun cup receptacle, inserting an insert comprising volumetric indicia into the open end of the spray gun cup receptacle.

Embodiment 17: The method of Embodiment 16 comprising determining the volume of the liquid by viewing the volumetric indicia through the aperture.

Embodiment 18: The method according to any of Embodiments 15-17 comprising adding additional liquid to the liner, and viewing the level of the combined liquids through an aperture in the sidewall of the spray gun cup receptacle.

Embodiment 19: The method according to any of Embodiments 15-18 comprising securing a lid to the open end of the spray gun cup receptacle, the lid comprising a liquid outlet.

Embodiment 20: The method of Embodiment 19 comprising attaching the liquid outlet to a spray gun.

Embodiment 21: The spray gun cup receptacle of any of Embodiments 1-8 comprising a tactile feedback member positioned on the sidewall directly adjacent an aperture.

Embodiment 22: The spray gun cup receptacle of Embodiment 21 wherein the tactile feedback member comprises a protrusion extending radially-outwardly from the sidewall.

Embodiment 23: The spray gun cup of any of Embodiments 9-14 wherein the spray gun cup receptacle comprises a tactile feedback member positioned on the sidewall directly adjacent an aperture.

Embodiment 24: The spray gun cup of Embodiment 23 wherein the tactile feedback member comprises a protrusion extending radially-outwardly from the sidewall.

Embodiment 25: The method of any of Embodiments 15-20 comprising, after adding liquid to the liner, gripping a sidewall of the spray gun cup receptacle comprising a tactile feedback member directly adjacent the aperture; and using feedback from the tactile feedback member to avoid gripping the liner through the aperture.

Embodiment 26: A spray gun cup lid comprising a lid body comprising a liquid outlet and an outlet connection member;

a flange comprising a lid connection structure to connect the lid to a compatible spray gun cup receptacle, wherein the flange is constructed as a separate part from the lid body and is retained on the lid body by a flange retention feature.

Embodiment 27: The lid of Embodiment 26 wherein the flange is permitted to rotate with respect to the lid body.

Embodiment 28: The lid of Embodiment 27 wherein the flange is permitted to rotate through a limited arc.

Embodiment 29: The lid of Embodiment 28 wherein rotation of the flange is limited by a flange rotation limiting feature.

Embodiment 30: The lid of Embodiment 29 wherein the flange rotation limiting feature interacts with the flange retention feature to limit rotation.

Embodiment 31: The lid of Embodiment 26 wherein the flange is rotationally fixed with respect to the lid body.

Embodiment 32: The lid of any of Embodiments 26-31 comprising a filter positioned to filter a liquid before the liquid exits the liquid outlet.

Embodiment 33: The lid of any of Embodiments 26-32 wherein the lid body comprises an inner lid body surface which is positioned to funnel paint to the liquid outlet in use.

Embodiment 34: A spray gun cup lid comprising a lid body comprising a liquid outlet; and a flange positioned at an outer periphery of the lid body, the flange comprising a lid connection structure; the lid connection structure comprising a flange tab comprising a lid engagement member.

Embodiment 35: The lid of Embodiment 34 wherein the lid engagement member comprises a lid camming surface.

Embodiment 36: The lid of Embodiment 35 wherein the lid camming surface comprises one of an inclined surface, a curved surface, a flat surface, or a combination thereof.

Embodiment 37: The lid of any of Embodiments 35-36 wherein the lid body comprises an inner lid body surface and wherein the lid camming surface faces generally toward the inner lid body surface.

Embodiment 38: The lid of any of Embodiments 35-37 wherein the flange comprises an access window corresponding to the flange tab, the access window providing an opening to access the lid camming surface.

Embodiment 39: The lid of any of Embodiments 34-38 wherein the flange comprises a flange opening dividing two flange tabs.

Embodiment 40: The lid of Embodiment 39 wherein the flange comprises at least three flange tabs and at least three flange openings.

Embodiment 41: The lid of any of Embodiments 39-40 wherein the flange opening(s) permit clearance for a release tab of a compatible liner.

Embodiment 42: The lid of any of Embodiments 39-41 comprising a flange bridging member connecting two flange tabs proximate a flange opening.

Embodiment 43: The lid of any of Embodiments 34-41 wherein the lid engagement member comprises an easy-start partial thread.

Embodiment 44: The lid of any of Embodiments 34-43 wherein the lid engagement member comprises a stop feature to prevent over-rotation of the lid when connecting to a compatible spray gun cup receptacle.

Embodiment 45: The lid of Embodiment 34 wherein the lid engagement member comprises a snap-fit feature to permit the lid to snap onto a compatible spray gun cup receptacle.

Embodiment 46: The lid of Embodiments 45 wherein the flange comprises an access window corresponding to the flange tab, the access window providing an opening to access the snap-fit feature.

Embodiment 47: The lid of any of Embodiments 34-44 wherein the flange is constructed as a separate part from the lid body and is retained on the lid body by a flange retention feature.

Embodiment 48: The lid of any of Embodiments 34-44 or 47 wherein the lid body comprises an outlet connection member.

Embodiment 49: The lid of any of Embodiments 47-48 wherein the flange is permitted to rotate with respect to the lid body.

Embodiment 50: The lid of Embodiment 49 wherein the flange is permitted to rotate through a limited arc.

Embodiment 51: The lid of Embodiment 50 wherein rotation of the flange is limited by a flange rotation limiting feature.

Embodiment 52: The lid of Embodiment 51 wherein the flange rotation limiting feature interacts with the flange retention feature to limit rotation.

Embodiment 53: The lid of any of Embodiments 47-48 wherein the flange is rotationally fixed with respect to the lid body.

Embodiment 54: The lid of any of Embodiments 34-53 comprising a filter positioned to filter a liquid before the liquid exits the liquid outlet.

Embodiment 55: The lid of any of Embodiments 34-54 wherein the lid body comprises an inner lid body surface which is positioned to funnel paint to the liquid outlet in use.

Embodiment 56: A spray gun cup receptacle comprising an open end surrounding a central axis;

a receptacle connection structure comprising a receptacle engagement member comprising a partial easy-start thread.

Embodiment 57: The spray gun cup receptacle of Embodiment 56 wherein the receptacle connection structure comprises at least two receptacle engagement members separated by a space around the periphery of the open end.

Embodiment 58: The spray gun cup receptacle of Embodiment 57 wherein the space is sized to permit complete clearance of a lid engagement member of a compatible lid when the lid is installed onto the spray gun cup receptacle along the central axis without relative rotation between the lid and the spray gun cup receptacle.

Embodiment 59: The spray gun cup receptacle of Embodiment 58 wherein at least one of the receptacle engagement members comprises a stop feature to prevent over-rotation of a compatible lid.

Embodiment 60: The spray gun cup receptacle of any of Embodiments 58-59 wherein at least one of the receptacle engagement members comprises a forward portion that is positioned at a height along the central axis to prevent reverse-rotation of a partially-installed lid.

Embodiment 61: A spray gun cup comprising a lid comprising a lid body;

a flange at the periphery of the lid body and comprising at least two flange tabs separated by a flange opening; and a liner comprising a release tab, wherein the release tab fits within the flange opening when the liner is assembled with the lid.

Embodiment 62: A spray gun cup comprising a spray gun cup receptacle comprising a receptacle connection structure; and a lid according to any of Embodiments 26-55.

Embodiment 63: The spray gun cup of Embodiment 62 comprising a liner.

Embodiment 64: The spray gun cup of Embodiment 63 wherein the liner comprises a release tab.

Embodiment 65: A spray gun cup comprising a spray gun cup receptacle according to any of Embodiments 56-60; and a lid comprising a lid engagement member comprising an easy-start partial thread.

Embodiment 66: The spray gun cup of Embodiment 65 wherein the lid engagement member comprises a rear portion that is positioned at a height along the central axis such that the rear portion contacts the forward portion of the receptacle engagement member to prevent reverse-rotation of the lid when it is partially installed.

Embodiment 67: The spray gun cup of any of Embodiments 65-66 comprising a liner.

Embodiment 68: The spray gun cup of Embodiment 67 wherein the liner comprises a release tab.

Embodiment 69: A spray gun cup comprising a spray gun cup receptacle according to any of Embodiments 56-60; and a lid according to any of Embodiments 26-55.

Embodiment 70: The spray gun cup of Embodiment 69 comprising a liner.

Embodiment 71: The spray gun cup of Embodiment 70 wherein the liner comprises a release tab.

Embodiment 72: A method of installing a lid onto a spray gun cup receptacle comprising inserting a liner comprising an open end into an open end of a spray gun cup receptacle such that the open end of the liner rests within the open end of the spray gun cup receptacle, the spray gun cup receptacle comprising a receptacle engagement structure;

positioning a lid over the open end of the spray gun cup receptacle such that a lid connection structure on the lid is rotationally aligned with the receptacle connection structure;

pushing the lid along a central axis into the open end of the liner to stretch the open end of the liner radially-outwardly around a liner sealing member on the lid; and after pushing the lid into the liner, rotating the lid connection structure to engage with the receptacle connection structure to lock the lid and liner in place against the spray gun cup receptacle.

Embodiment 73: The method of Embodiment 72 wherein the pushing step comprises pushing the lid essentially into its final position in the liner prior to rotating the lid connection structure.

Embodiment 74: The method of Embodiment 73 wherein the pushing step comprises pushing a lid rim into contact with a liner rim.

Embodiment 75: The method of any of Embodiments 72-74 wherein the rotating step comprises engaging a camming surface on the spray gun cup receptacle with a lid camming surface to apply an attractive force along the central axis tending to draw the lid toward the spray gun cup receptacle.

Embodiment 76: The method of any of Embodiments 72-75 comprising, after rotating step, rotating the lid connection structure in the opposite direction to disengage the lid connection structure from the receptacle connection structure; and removing the liner from the lid.

Embodiment 77: The method of Embodiment 76 comprising, prior to removing the liner from the lid, lifting the lid, together with the liner, from the spray gun cup receptacle.

Embodiment 78: The method of any of Embodiments 76-77 wherein removing the liner from the lid comprises gripping a release tab on the liner to peel the liner from the lid sealing member.

Embodiment 79: A method of installing a lid on a spray gun cup receptacle comprising positioning a lid onto an open end of a spray gun cup receptacle, the lid comprising a lid body, a flange, and a flange tab comprising a lid engagement member;

installing the lid onto the spray gun cup receptacle by engaging the lid engagement member with a receptacle engagement member on the spray gun cup receptacle;

lifting the flange tab to release the lid engagement member from the receptacle engagement member; and lifting the lid from the spray gun cup receptacle.

Embodiment 80: The method of Embodiment 79 wherein the installing step comprises rotating the flange with respect to the spray gun cup receptacle.

Embodiment 81: The method of Embodiment 79 wherein the installing step comprises axially translating the flange toward respect to the spray gun cup receptacle without rotation.

Embodiment 82: The method of any of Embodiments 79-81 wherein lifting the flange tab and lifting the liner from the spray gun cup receptacle does not require any rotation of the flange with respect to the spray gun cup receptacle.

Embodiment 83: A spray gun cup lid comprising a modular lid base; and a modular liquid outlet that is formed independently of the modular lid base and is connected at an interface to the modular lid base, the modular liquid outlet comprising an outlet connection member to allow connection to a compatible spray gun.

Embodiment 84: The lid of Embodiment 83 wherein at least one of the modular lid base or the modular liquid outlet comprises a sealing feature which creates a liquid-tight seal when the modular liquid outlet is installed onto the modular lid base.

Embodiment 85: The lid of Embodiment 84 wherein the sealing feature is located on a cylindrical protrusion depending from at least one of the modular lid base or the modular liquid outlet.

Embodiment 86: The lid of any of Embodiments 84-85 wherein the sealing feature comprises at least one radial sealing rib.

Embodiment 87: The lid of any of Embodiments 84-86 wherein the liquid outlet on the modular liquid outlet comprises an interior surface, and wherein assembly of the modular liquid outlet to the modular lid base creates a liquid-tight seal on the interior surface.

Embodiment 88: The lid of any of Embodiments 83-87 wherein at least one of the modular lid base or the modular liquid outlet comprises an alignment feature to rotationally position and retain the modular lid base and the modular liquid outlet during assembly.

Embodiment 89: The lid of any of Embodiments 83-88 wherein the modular liquid outlet is installed onto the modular lid base by one of spin welding, sonic welding, twist-locking, adhesives, threads, mechanical fasteners, deformed posts, or combinations thereof.

Embodiment 90: The lid of any of Embodiments 83-89 wherein the modular liquid outlet is non-destructively removable from the modular lid base.

Embodiment 91: The lid of any of Embodiments 83-90 wherein the modular liquid outlet is constructed from a different material than the modular lid base.

Embodiment 92: The lid of any of Embodiments 83-91 wherein the modular liquid outlet is adapted to alternatively connect to a paint source other than a spray gun cup such that paint can be fed directly to a spray gun via the modular liquid outlet.

Embodiment 93: A method of designing a spray gun lid to fit a particular model of spray gun comprising determining the paint inlet connection geometry for a particular spray gun;

constructing a modular liquid outlet comprising outlet connection geometry to fit the paint inlet connection geometry on the spray gun; and packaging the modular liquid outlet with a modular lid base, wherein the modular liquid outlet is adapted to install onto the modular lid base to for a lid to fit the spray gun.

Embodiment 94: The method of Embodiment 93 wherein the packaging step comprises installing the modular liquid outlet to the modular lid base such that no further assembly is required.

Embodiment 95: The method of Embodiment 93 wherein the packaging step comprises leaving the modular liquid outlet and the modular lid base unassembled for later assembly by a downstream customer or end user.

Embodiment 96: The method of any of Embodiments 93-95 comprising designing a plurality of modular liquid outlets that are installable onto a single modular lid base but fit a plurality of spray guns.

Embodiment 97: The method of Embodiment 96 comprising, prior to constructing the modular liquid outlet, accepting a request from a customer to provide a lid to fit the particular spray gun.

Embodiment 98: The method of any of Embodiments 93-97 comprising instructing a downstream customer or user to install a modular liquid outlet for the particular spray gun onto the modular lid base.

Embodiment 99: A method of using a spray gun lid comprising installing a modular liquid outlet to a modular lid base to form a lid; and connecting the lid to a spray gun.

Embodiment 100: The method of Embodiment 99 comprising, prior to installing the modular liquid outlet to the modular lid base, choosing from at least two different modular liquid outlets designed to fit different spray guns and determining the correct modular liquid outlet to install.

Embodiment 101: A spray gun lid kit comprising a modular lid base and at least two modular liquid outlets.

Embodiment 102: The kit of Embodiment 101 wherein the at least two modular liquid outlets comprise different outlet connection members designed to fit a paint inlet connection geometry on more than one spray gun.

Embodiment 103: A spray gun lid kit comprising a lid according to any of Embodiments 83-90 and at least one additional modular liquid outlet.

Embodiment 104: The kit of Embodiment 103 wherein at least two modular liquid outlets comprise different outlet connection members designed to fit a paint inlet connection geometry on more than one spray gun.

Embodiment 105: A spray gun cup receptacle or method comprising the use of a spray gun cup receptacle as described in any of Embodiments 56-60 and/or 65-82 wherein the spray gun cup receptacle and/or method comprises the features of any of Embodiments 1-25.

Embodiment 106: A spray gun cup receptacle comprising an open end for receiving a liner within a cavity; a sidewall surrounding the cavity and connecting the open end to the base end, the sidewall comprising an aperture through which the cavity is visible from outside the spray gun cup receptacle; and a tactile feedback member positioned on the sidewall directly adjacent the aperture.

Embodiment 107: The spray gun cup receptacle of Embodiment 106 wherein the tactile feedback member comprises a protrusion extending radially-outwardly from the sidewall.

These, as well as other aspects, advantages, and alternatives, will become apparent to those of ordinary skill in the art by reading the following detailed description, with reference, where appropriate, to the accompanying drawings.

It should be noted that, for simplicity, the term "paint" is used throughout this specification, but it will be understood that this does not limit the spray gun cup receptacle to use with paint and that the spray gun cup receptacle is suitable for use with all liquids which are suitable for use in a liquid spray gun system.

Additionally, it will be understood that terms such as "top", "bottom", "upper", "lower", "under", "over", "front", "back", "outward", "inward", "up", "down", "first", and "second", which may be used in this disclosure, are used in their relative sense only, unless otherwise noted.

DETAILED DESCRIPTION

It should be noted that in the accompanying figures, some elements may be present in identical or equivalent multiples; in such cases, only one or more representative elements may be designated by a reference number, but it will be understood that such reference numbers apply to all such identical elements.

Figure 1A:
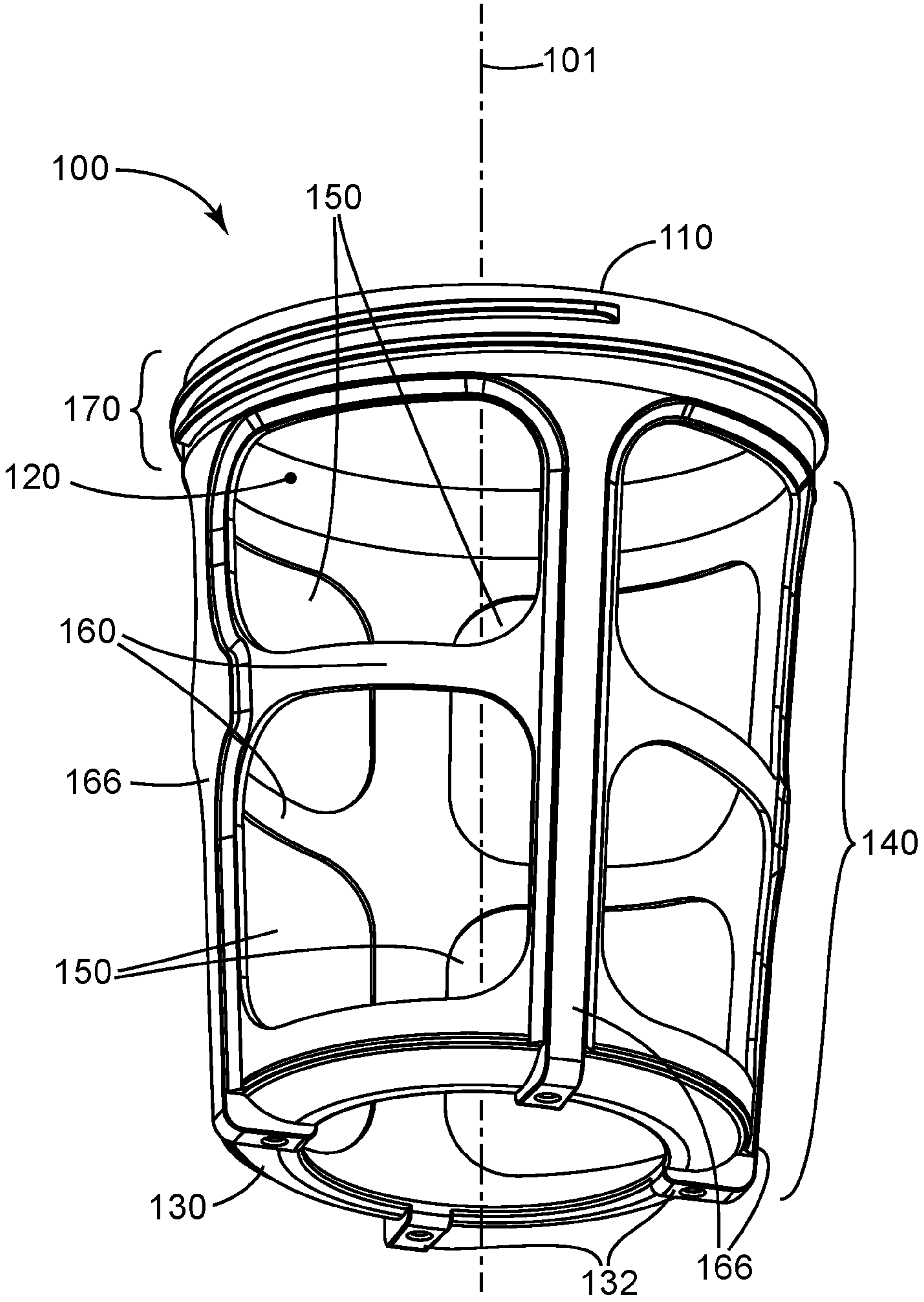
FIG. 1A is an isometric view of an embodiment of a spray gun cup receptacle according to the present disclosure.
Figure 1B:
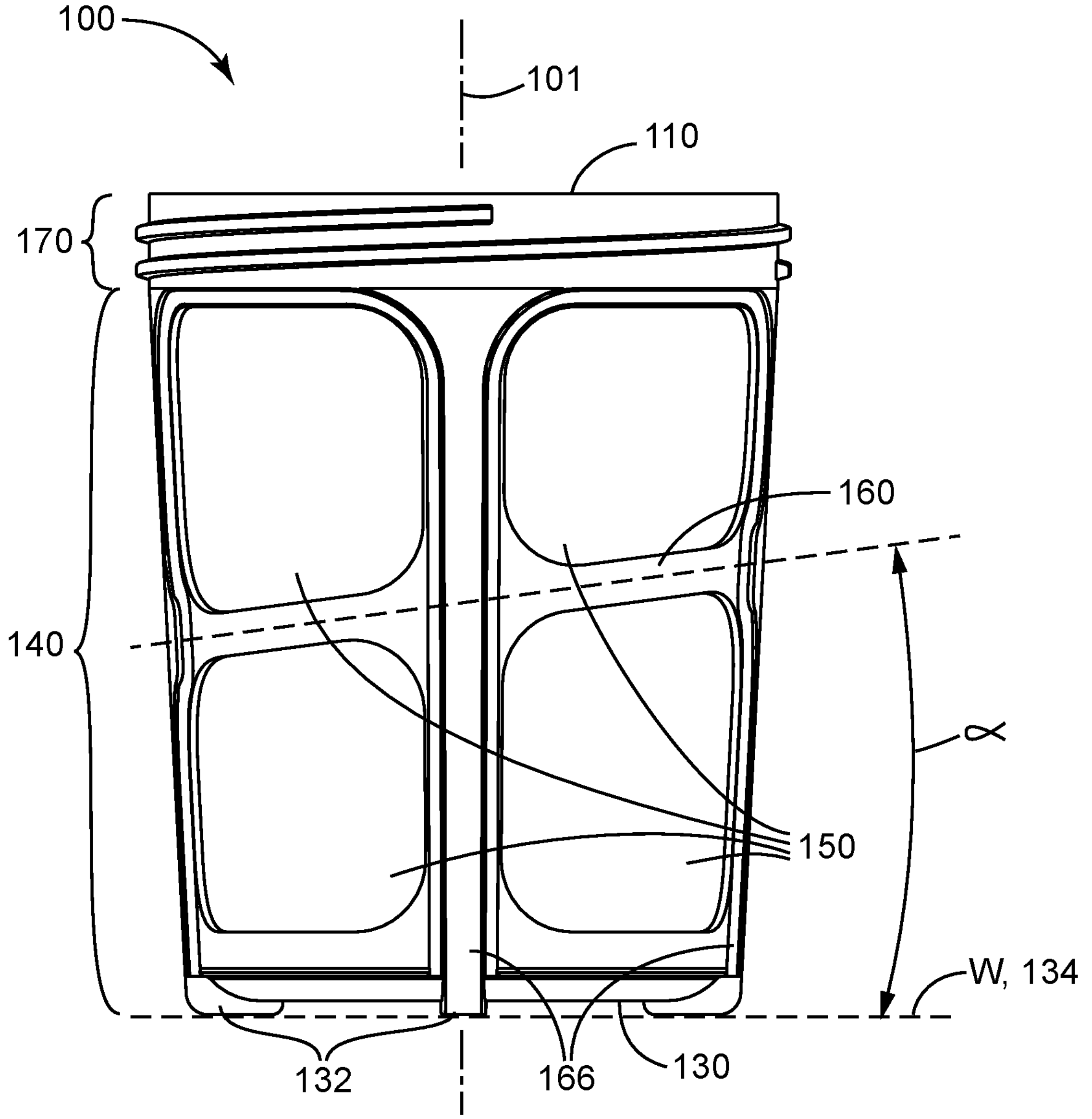
FIG. 1B is a side view of the embodiment of a spray gun cup receptacle presented in FIG. 1A according to the present disclosure.

FIGS. 1A and 1B depict an exemplary embodiment of a spray gun cup receptacle 100 according to the present disclosure. The spray gun cup receptacle 100 comprises an open end 110 providing access to an interior cavity 120. Opposite the open end 110 is a base end 130. As shown, the base end 130 comprises an essentially flat configuration having optional feet 132 enabling the base to be stably rested directly on a flat work surface W (not shown in FIG. 1A). The number, shape, and placement of the feet 132 may be varied as needed. In some embodiments, the base end 130 is not itself flat, but can be held at rest on a work surface as above with the assistance of an additional structure (i.e., a holder or the like).

Whether the base end 130 is flat or not, a base end plane 134 can be drawn through the base end 130 (while at rest and upright as indicated above) parallel to the work surface W, as shown in FIG. 1B.

In this embodiment, a sidewall 140 surrounds the cavity 120 and connects the open end 110 to the base end 130. The sidewall 140 comprises a series of apertures 150 (at least two, but in this particular embodiment eight) that penetrate the sidewall 140 to permit the contents of the cavity 120 to be viewed therethrough. There is no requirement as to how much material is required to constitute a sidewall 140; it is to be understood that a sidewall 140 exists so long as the open end 110 and the base end 130 are connected. As shown, the apertures 150 are divided by a brace member 160 and by support members 166. Generally, the support members 166 provide support in the axial direction (along a central axis 101, and orthogonal to the base end plane 134), while the brace member 160 provides, inter alia, hoop strength to the spray gun cup receptacle 100 at an intermediate position between the open end 110 and the base end 130. In the embodiment shown, there are four vertical support members 166. However, it is envisioned that there could be a different number of support members 166 (e.g., one, two, three, five, six, or seven or more), and that the support members 166 could be non-vertical or only generally vertical. By "generally vertical", it is meant that an imaginary straight line drawn to represent an average of the trajectory of a support member from the base end 130 to the open end 110 is within +/−five degrees of vertical. It should be understood that the term "vertical" as used herein refers to the orientation of geometry assuming the spray gun cup receptacle 100 were resting with a flat base end 130 resting on a level, flat work surface.

In some embodiments, the sidewall 140 spray gun cup receptacle 100 may be highly apertured, such that relatively minimal support structure (e.g., brace member 160(*s*) and/or support member(s)) are provided. In such cases, it may be advantageous to construct the spray cup receptacle (particularly the sidewall 140) from a relatively strong material, such as a filled polyamide.

It can further be seen in the embodiment of FIGS. 1A and 1B that the spray gun cup receptacle 100 comprises receptacle connection structure 170 proximate its open end 110. This receptacle connection structure 170 enables a separate lid member 300 (not shown in FIGS. 1A-1D) to be secured to the spray gun cup receptacle 100. As shown, the receptacle connection structure 170 comprises threads. However, other connection structures may be employed to provide a different connection mechanism (e.g., a helical wedge connection, a snap-fit connection, a push-fit connection, a twist-lock connection, a clip connection, a latch connection, a hinged connection, or combinations thereof).

Figure 1C:
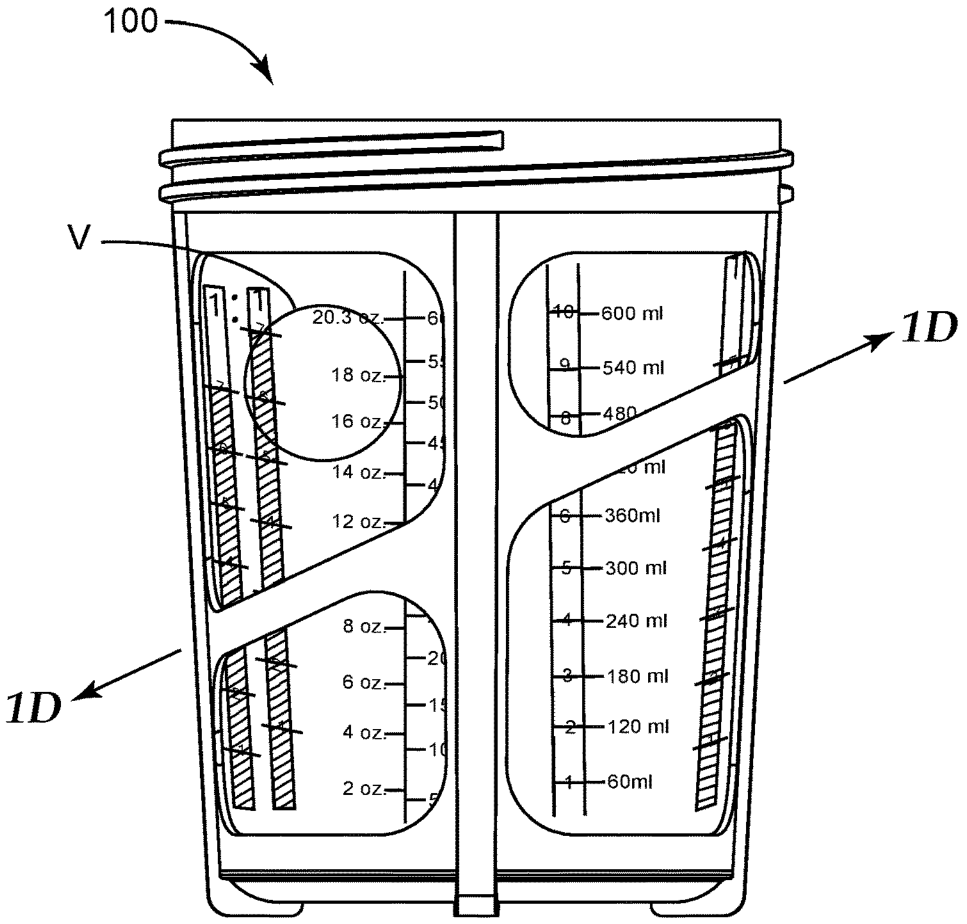
FIG. 1C is a side view of the embodiment of a spray gun cup receptacle including volumetric indicia according to the present disclosure.

Turning now to FIG. 1C, a spray gun cup receptacle 100 similar to those shown in FIGS. 1A and 1B is further provided with volumetric indicia "V." The volumetric indicia provide the painter a way to determine the volume and/or ratio of liquid component(s) in the cavity 120. The volumetric indicia may be provided as a separate insert 600 (see, e.g., FIGS. 4C and 5C), imprinted or otherwise disposed on a liner 200, or otherwise positioned between the spray gun cup receptacle 100 and the cavity 120 where liquids may be contained.

As can be seen in FIGS. 1B and 1C, the brace member 160 are disposed at a suitable brace member 160 angle $\alpha$ that permits the volumetric indicia to be viewed at any height within the cavity 120. For example, although as shown in FIG. 1C the "10 oz." indicia is hidden behind the brace member 160, a simple rotation of the volumetric indicia would enable it to be viewed (for example, by rotating the volumetric indicia such that "12 oz." would appear in the lower right-hand aperture). Alternatively, or in addition, the volumetric indicia may be repeated such that an identical volume marking appears in more than one location, wherein at least one of the locations is not visually occluded by the brace member 160. In this way, the disposition of the brace member 160 can permit the volume of the contents to be accurately determined at any liquid level.

In the exemplary embodiments of FIGS. 1A and 1B, the magnitude of the brace member 160 angle $\alpha$ is about 7.5 degrees as referenced from the base end plane 134. In the embodiment of FIG. 1C, (in order to make the below-described trajectory "T" more visually apparent) the magnitude of the brace member 160 angle $\alpha$ is about 25 degrees as referenced from the base end plane 134. However, the brace member 160 angle α (or "angles" in the case of more complex shapes) may be chosen as any angle greater than 0 degrees and less than 90 degrees (i.e., the brace member 160 is neither parallel nor orthogonal to the base end plane 134) that both facilitates the structural requirements of the spray gun cup receptacle 100 and also provides visibility as described herein at all levels of the cavity 120 through at least one aperture. A brace member 160 should divide at least two apertures 150 such that the apertures 150 are positioned—at least partially—vertically one over the other, and thus brace member 160 angles α much less than 90 degrees (e.g., 30 degrees or less) are expected for most spray gun cup receptacle 100 sizes and geometries. As can be seen in embodiments of the Figures, apertures 150 are divided by brace members disposed at brace member 160 angles α such that an upper aperture is positioned higher than a lower aperture, thereby permitting visibility at all liquid levels.

Figure 2:
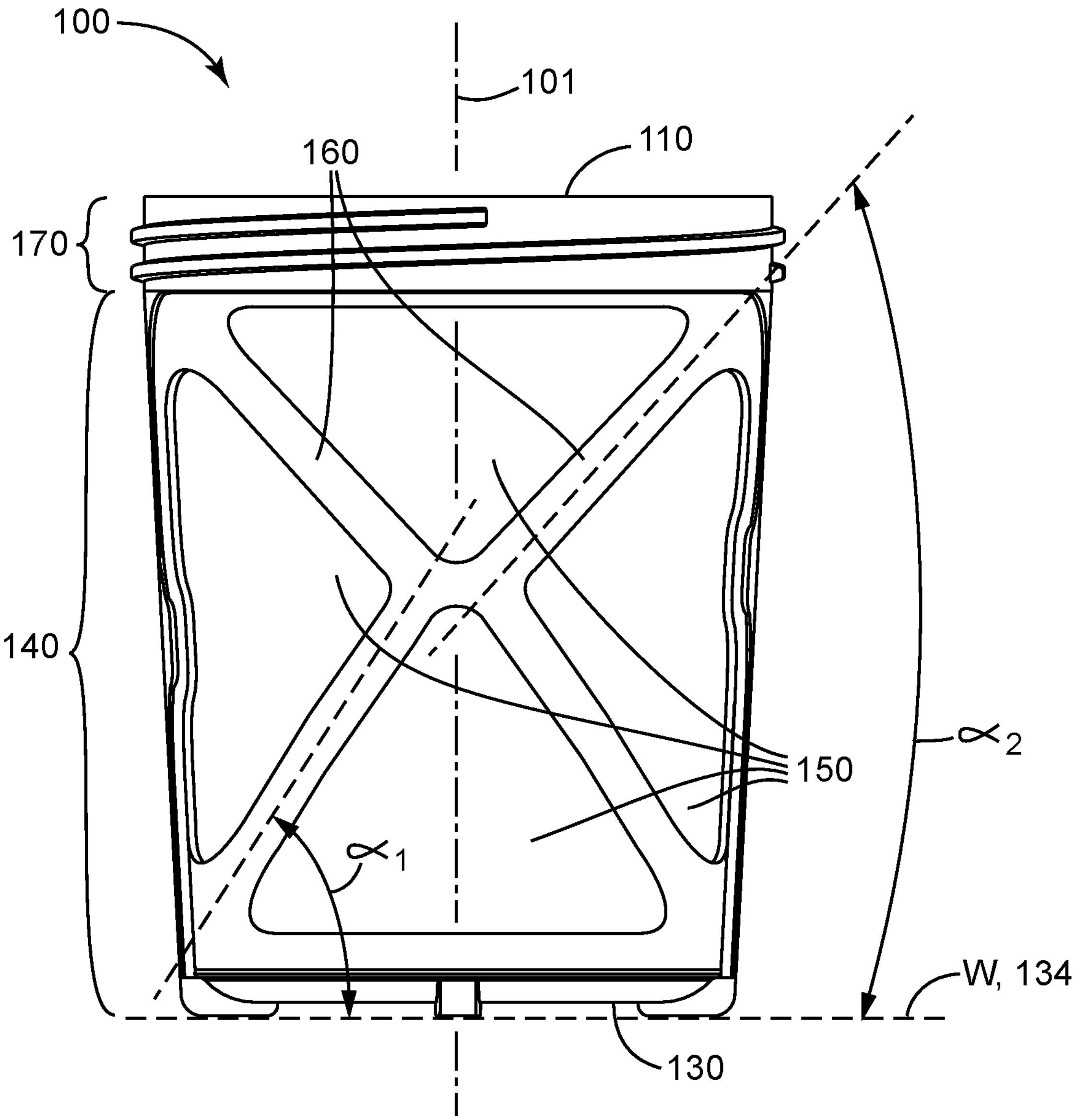
FIG. 2 is a side view of an embodiment of a spray gun cup receptacle according to the present disclosure.
Figure 3:
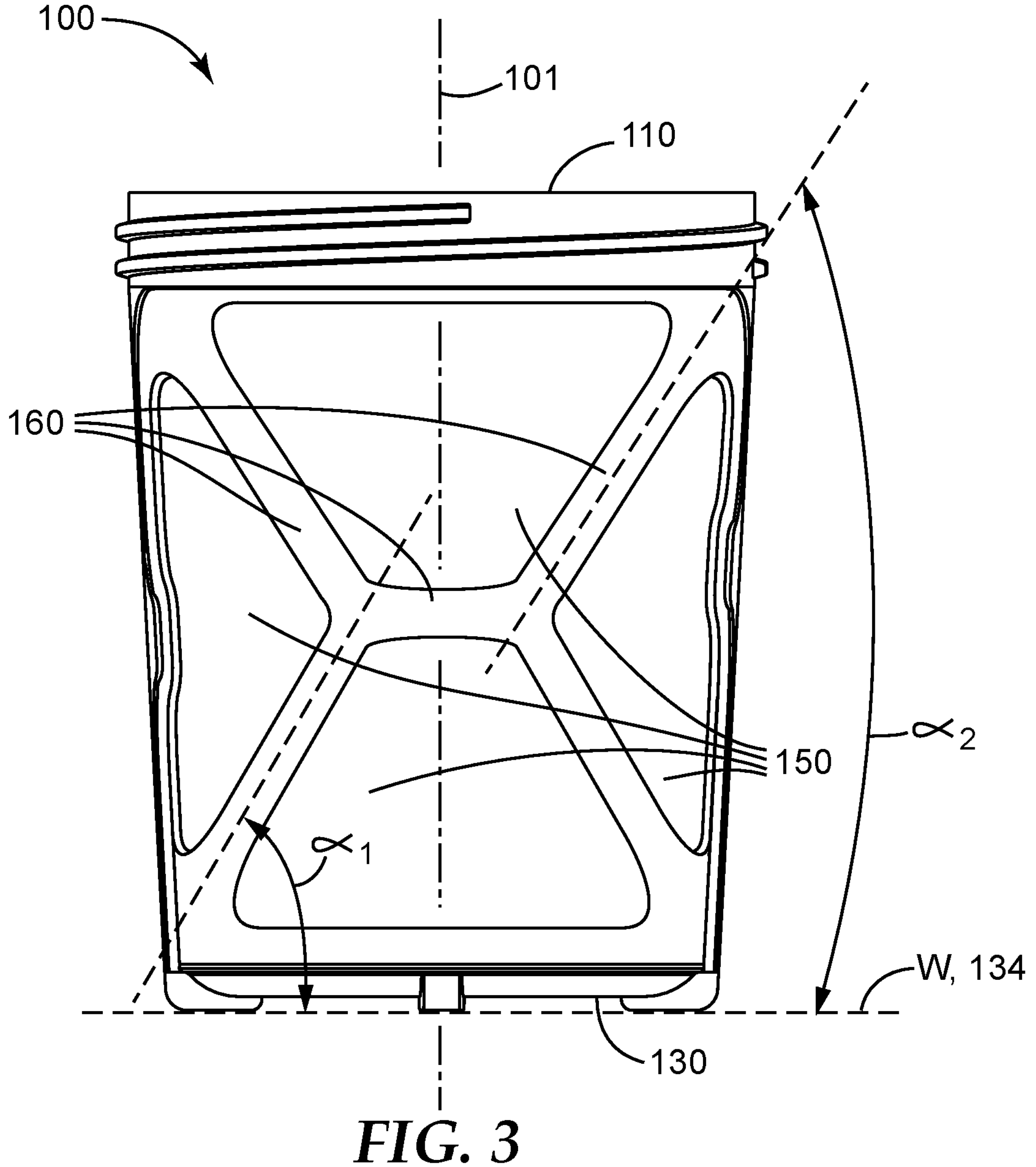
FIG. 3 is a side view of an embodiment of a spray gun cup receptacle according to the present disclosure.

In some embodiments, multiple brace members 160 with different corresponding angles $\alpha_1$, $\alpha_2$, $\alpha_3$, etc. may form more complex shapes (see, e.g., FIGS. 2 and 3). In some embodiments, the brace member 160 angle α is at least about 2 degrees as referenced from the base end plane 134. In some embodiments, the brace member 160 angle α is less than or equal to about 30 degrees as referenced from the base end plane 134. In some embodiments, the brace member 160 angle α is in a range from about 2 degrees to about 30 degrees as referenced from the base end plane 134, including, without limitation, 4, 7, 11.5, 16, and 25 degrees, including any angle therein.

Figure 1D:
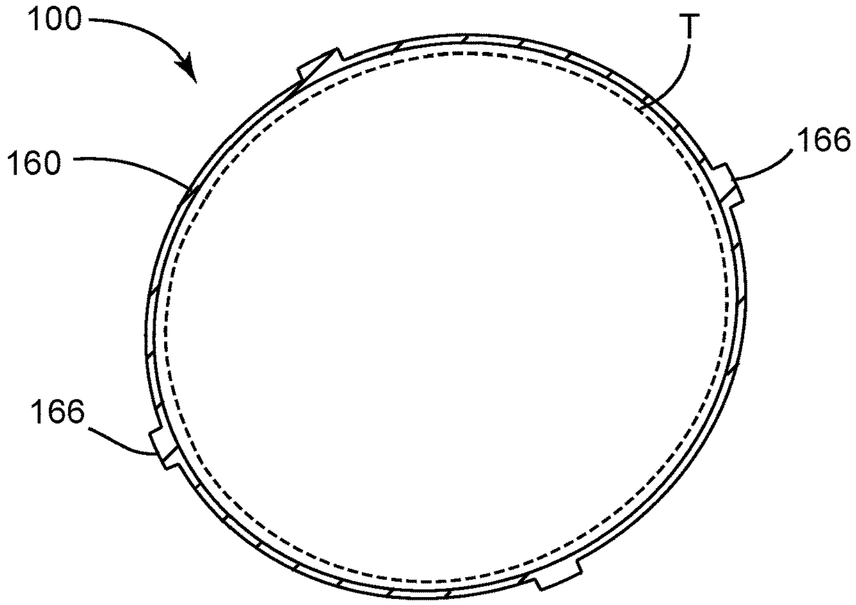
FIG. 1D is a cross-sectional view taken at 1D-1D of FIG. 1C of a spray gun cup receptacle according to the present disclosure.

As shown in the embodiment of FIG. 1D, the trajectory "T" followed by the brace member 160 as it circumscribes the cavity 120 can be described as a non-circular ellipse. As used herein, "non-circular ellipse" means an ellipse whose eccentricity is not zero. In embodiments where the sidewall 140 of the spray gun cup receptacle 100 is generally cylindrical, the eccentricity may be calculated as the sine of the brace member 160 angle α in degrees (i.e., eccentricity=SIN (α)). Generally, for such embodiments, the eccentricity will increase as the brace member 160 angle α increases, and vice-versa. In some embodiments, the eccentricity of the trajectory "T" is at least 0.03. In some embodiments, the eccentricity of the trajectory "T" is less than or equal to 0.5. In some embodiments, the eccentricity of the trajectory "T" is in a range from about 0.03 to about 0.5.

It should be understood that the trajectory "T" need not be strictly elliptical in order to fall within the scope of the present disclosure. For example, the spray gun cup receptacle 100 may be formed as generally cylindrical, but with a slight draft angle (e.g., approximately 3 degrees) such that its profile increases from the base end 130 to the open end 110, resulting in a trajectory "T" along the brace member 160 angle α that is generally elliptical, but in reality is slightly "egg-shaped."

In other embodiments, the brace member 160 may follow a differing trajectory or trajectories. For example, FIGS. 2 and 3 depict alternative embodiments of spray gun cup 500 receptacles comprising more than one brace member 160 disposed in a manner different from the embodiments of FIGS. 1A-1D. Alternatively, or in combination, a brace member 160 could be provided to follow a trajectory whose brace member 160 angle α varies as its position about the sidewall 140 varies—e.g., a sinusoidal wave, a square wave, or a sawtooth pattern. Such waves or patterns could be repeating or irregular. Moreover, although the embodiments of spray gun cup 500 receptacles depicted herein all show a generally circular cross-section, this need not be the case. For example, the cross-sectional shape of the spray gun cup receptacle 100 at any given height may comprise a polygon such as a hexagon or octagon or any other shape that permits the functional purposes set forth herein to be realized. For example, in all cases the brace member 160 will be shaped and disposed to enable visibility of the cavity 120 as described elsewhere herein.

Figure 4A:
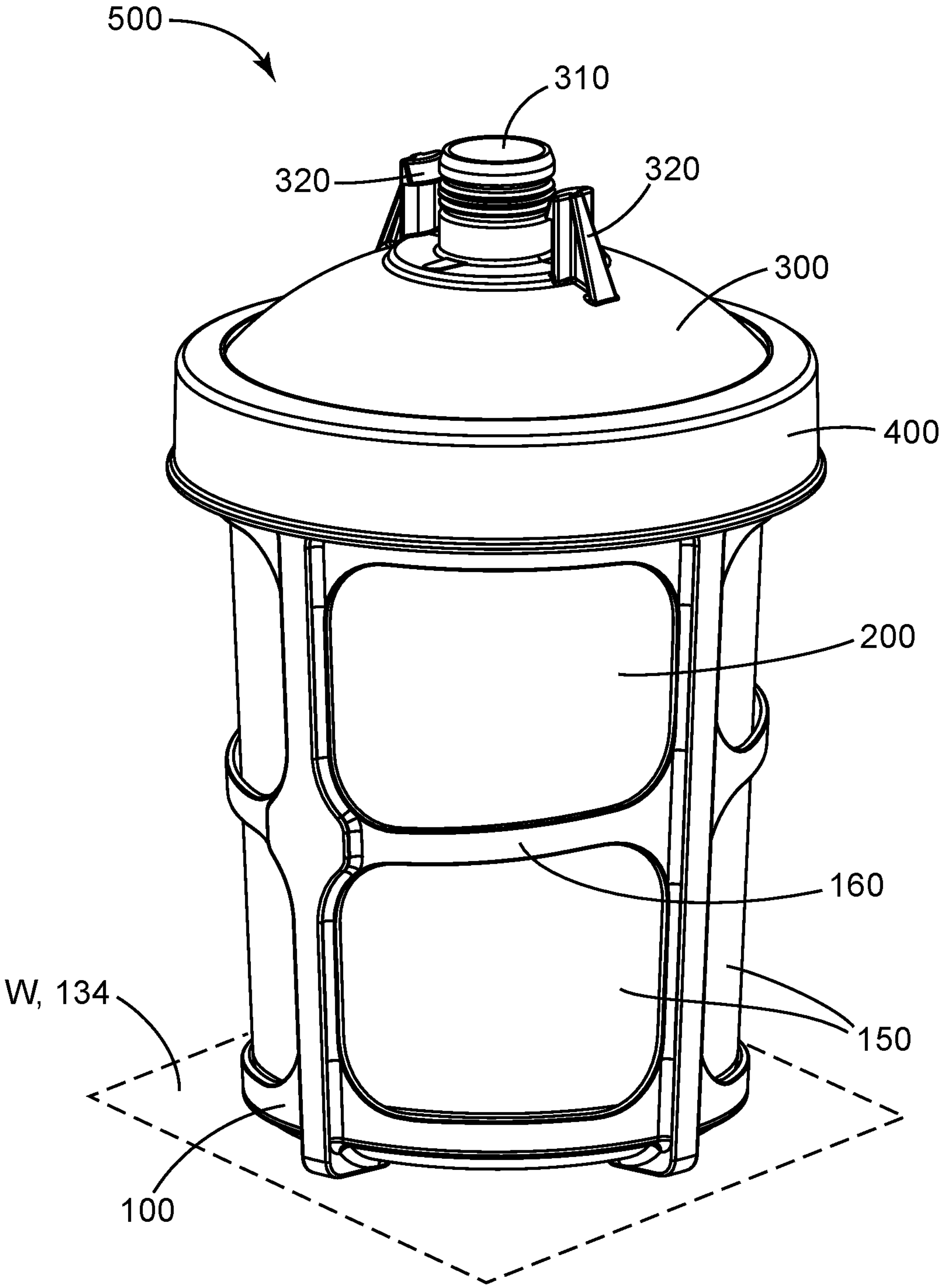
FIG. 4A is an isometric view of an embodiment of a spray gun cup according to the present disclosure.

FIG. 4A depicts a spray gun cup 500 comprising a spray gun cup receptacle 100 as shown, for example, in FIG. 1A. This embodiment includes a liner 200 positioned in the cavity 120 of the spray gun cup receptacle 100. The liner 200 has an open end 210 (see FIGS. 4C-4D) corresponding to the open end 110 of the spray gun cup receptacle 100. A lid member 300 is secured to the spray gun cup receptacle 100, to the liner 200, or to both. The lid member 300 can be secured in many ways. As shown in FIGS. 4A-4D, an optional collar 400 (cf. FIGS. 5A-5D) captures the lid member 300 and the liner 200 between the collar 400 and the spray gun cup receptacle 100 via collar connection structure 470—in this case screw threads. Any of the receptacle connection structures 170 earlier described may be used in similar fashion to permit an optional collar 400 to attach to the remainder of the spray gun cup 500. In addition, or in the alternative, the lid member 300 itself can be provided with lid connection structure 370 to compliment the collar connection structure 470. In such embodiments, for example, the collar 400 can be configured to attach from below the lid member 300 to capture the liner 200 between the lid member 300 and the collar 400. In such embodiments (and in other embodiments described herein) the spray gun cup receptacle may remain with the spray gun cup during spraying, or the lid, liner, and collar may be detached or removed from the spray gun cup receptacle 100 as a unit during spraying (in which case the spray gun cup receptacle 100 may be primarily used as a mixing vessel only).

As shown, the lid member 300 comprises a liquid outlet 310 and one or more outlet connection members 320 to permit the lid 300 to be connected to the liquid inlet of a spray gun. An outlet connection member 320 may be provided on, about, adjacent, or remote from, the liquid outlet 310 so long as it facilitates secure, liquid-tight connection to a spray gun. Optionally, the lid comprises a filter (not shown) to permit the liquid in the spray gun cup to be filtered prior to spraying.

Figure 17:
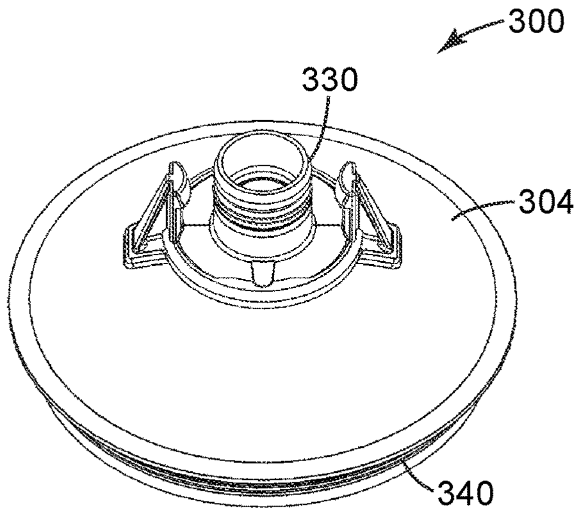
FIG. 17 is an isometric view of a lid comprising modular components according to the present disclosure.
Figure 18:
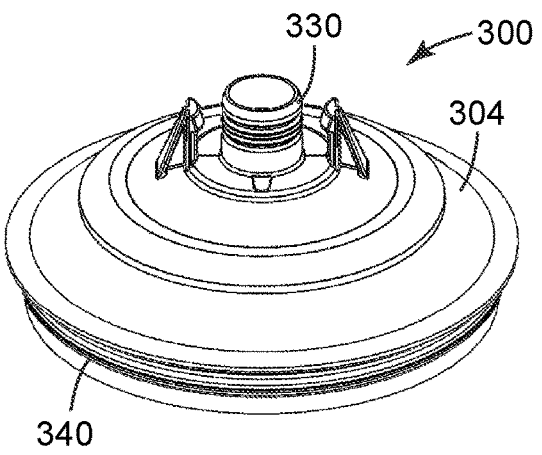
FIG. 18 is an isometric view of a lid comprising modular components according to the present disclosure.
Figure 17A:
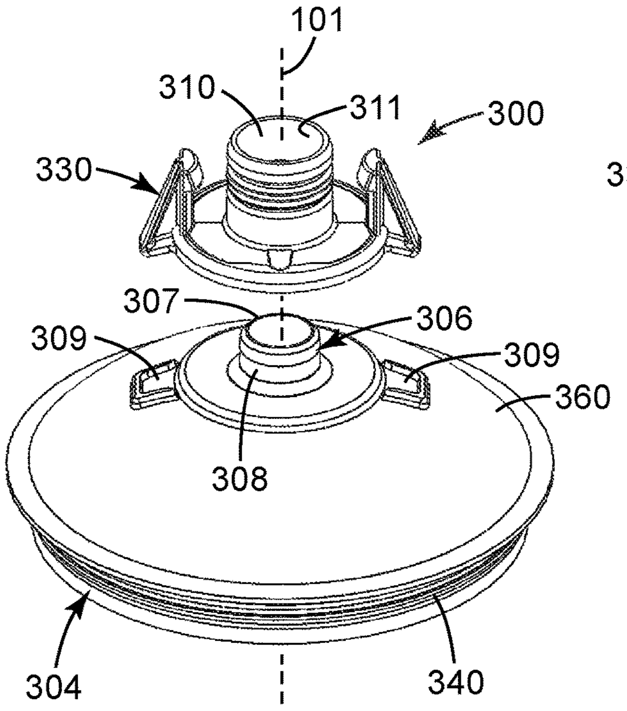
FIG. 17A is an exploded view of the lid of FIG. 17.
Figure 18A:
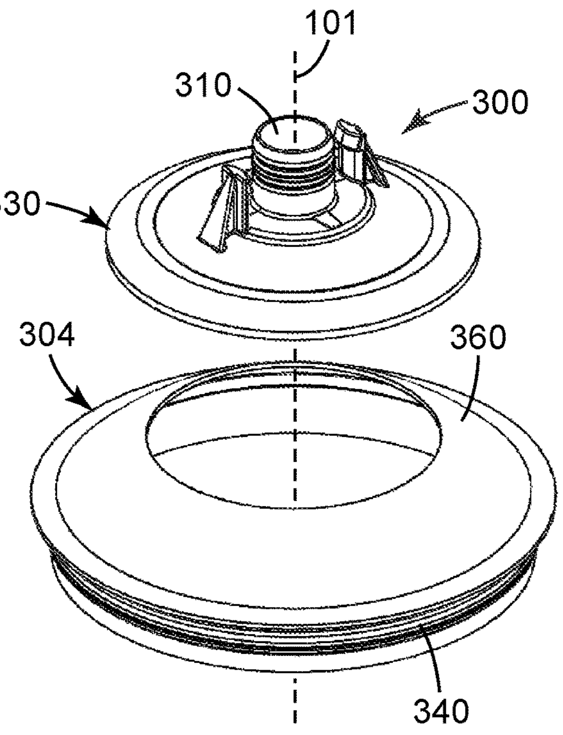
FIG. 18A is an exploded view of the lid of FIG. 18.
Figure 19:
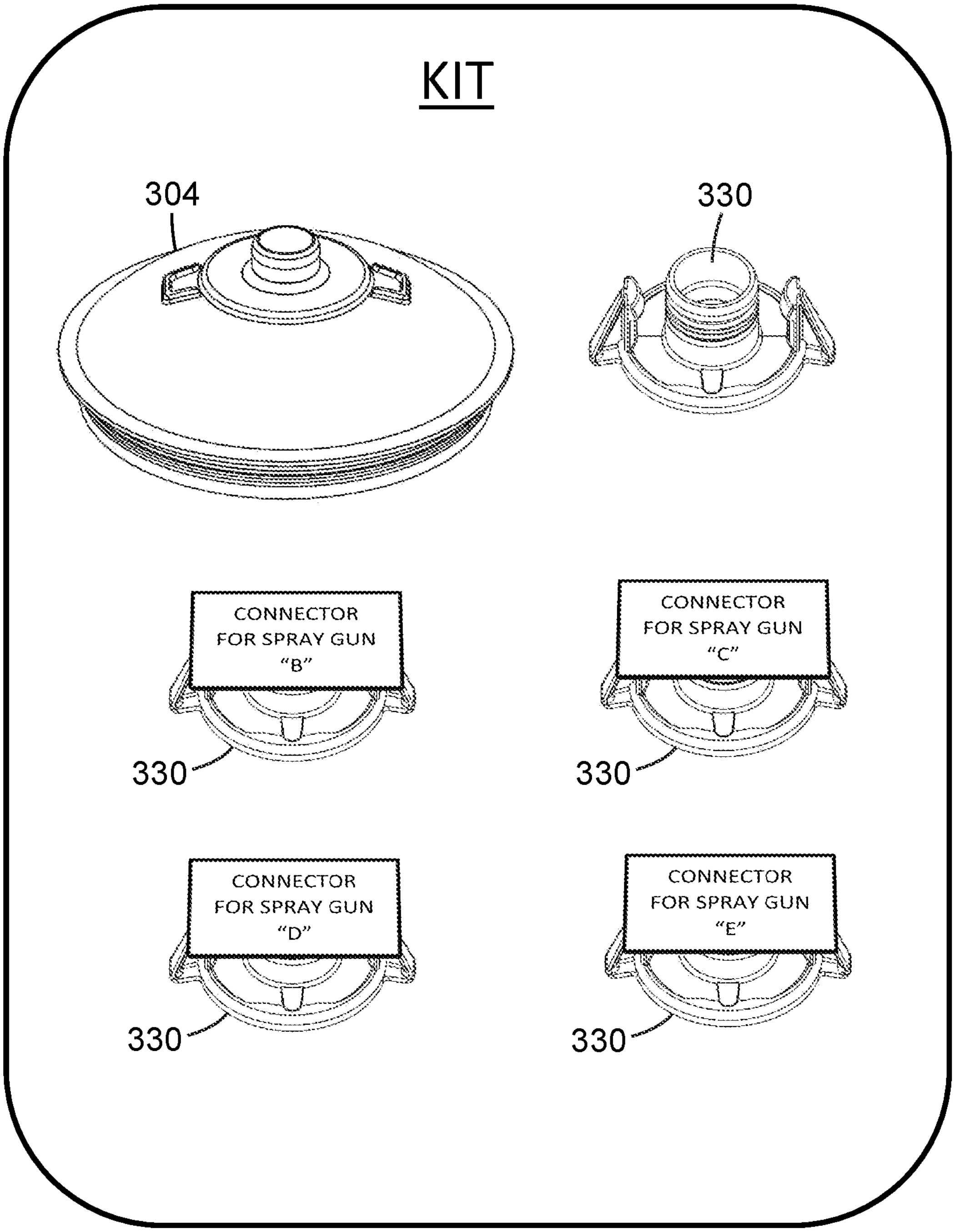
FIG. 19 is an isometric view depicting a kit comprising modular lid components as described herein.

The liquid outlet 310 and/or outlet connection member(s) 320 may be formed integrally with the remainder of the lid 300. Alternatively, these components may be initially formed as a separate, modular part or assembly comprising connection geometry to permit connection to the remainder of the lid 300. Example of such a configurations are depicted in FIGS. 17-18A, which each depict exemplary lid 300 comprising a modular lid base 304 and a modular liquid outlet 330 connected thereto. FIGS. 17A and 18A depict the assemblies of FIGS. 17 and 18, respectively, in a disassembled state, while FIG. 19 depicts a modular lid base 304 as a kit provided with a plurality of modular liquid outlets 330 configured to fit a variety of spray guns (in this case the alternate spray guns are labeled "B," "C," "D," "E," etc.). Such an approach can be advantageous, for example, by allowing a single lid/receptacle combination to connect to multiple spray guns without the need for either (i) separate adapters; or (ii) separate tooling to create custom lids for each gun. Instead, a common modular lid base 304 can be manufactured in a single (likely larger) tool, while the smaller modular liquid outlets 330—which presumably would be manufactured at a lower volume—can be manufactured on smaller, less expensive tooling and equipment. With this approach, changes in the connection geometry to a particular spray gun, or the introduction of new spray guns, can be accommodated without the need to modify of the tooling for the modular lid base.

Examples of outlet connection members 320 useful for lids 300 described herein (for example, in the kits described in the preceding paragraph) include, for example, those shown and described in U.S. application Ser. No. 15/375,556 (entitled "Reservoir systems for hand-held spray guns and methods of use"), and in U.S. Provisional Application Nos. 62/322,492, 62/279,619 and 62/279,537 (respective entitled "Connector systems for hand-held spray guns," entitled "Wide-Mouthed Fluid Connector for Hand-Held Spray Guns," and entitled "Button-Lock Fluid Connector for Hand-Held Spray Guns"), the disclosures of which are hereby incorporated by reference in their entirety.

A modular liquid outlet 330 provided as above could alternatively be attached or preassembled to the end of a paint supply line or pouch etc. and in turn connected to the spray gun pain t inlet. In this way, paint could be directly to the spray gun without the need for the modular lid base 304, the liner 200, or the spray gun cup receptacle 100.

Constructing the lid 300 using a modular liquid outlet 330 and a modular lid base 304 can provide a further advantage or allowing more complex geometries to be feasibly created than may otherwise be possible using, e.g., injection molding. For example, in a given lid 300, it may be impossible to form a particular geometry in an injection molded part due to the locations of mold parting lies and the necessary trajectory of slides required to form certain features. However, if the lid 300 is split into modular components, tooling can be designed to directly access surfaces of each modular component that would not have been accessible on the one-piece lid. Thus, further geometric complexity can be achieved.

Modular lid components may also be constructed of different materials as desirable for the application. For example, it may be desirable to use an engineering plastic for the modular liquid outlet 330 (due the strength and tolerances required for a secure and durable connection to the spray gun), while lower cost polymers could be used for the modular lid base 304.

A modular liquid outlet 330 could be secured to the modular lid base 304 (or vice versa) in a variety of ways. For example, spin welding, sonic welding, quarter turn locking, other mechanical locking mechanisms, glues/adhesives, threaded, other mechanical fasteners i.e. screws, rivets and/or molded posts that are cold formed/hot formed and mushroomed down to hold/retain the component(s) in place and provide a suitable leak-proof seal.

In the embodiment shown in FIGS. 17-17A, the modular liquid outlet 330 is located against and secured to the modular lid base 304 with the aid of a sealing feature 306 and an alignment feature 309. In this case, the sealing feature 306 is on the modular lid base 304 and comprises a cylindrical protrusion 307 comprising a one or a plurality of radial sealing ribs 308 adapted to interact with an interior surface 311 of liquid outlet 310 to create a liquid-tight seal upon assembly of the modular liquid outlet 330 to the modular lid base 304. Likewise, the alignment features 309 assist to locate the two parts together and also to resist relative rotation of the parts once assembled. The two parts may be additionally secured by an adhesive, welding, or the like after assembly, if desired. Alternatively, the fit between the modular liquid outlet 330 and the modular lid base 304 may be constructed to be sufficiently secure without the aid of further fasteners (e.g., by way of a friction fit, snap-fit, thread, or the like). Sealing features 306 and/or alignment features 309, where used, may be interchanged between the two parts as appropriate.

In the embodiment shown in FIGS. 18-18A, the modular liquid outlet 330 is secured to the modular lid base 304 by way of welding and/or an adhesive or the like. In this case, the adhesive joint and/or weld joint act to both retain and create a liquid-tight seal upon assembly of the modular liquid outlet 330 to the modular lid base 304.

It should be understood that any of the lids 300 described herein and depicted throughout FIGS. 1-16B could be constructed in a modular fashion and/or provided in kits as described in the preceding several paragraphs and depicted in FIGS. 17-19.

Figure 4B:
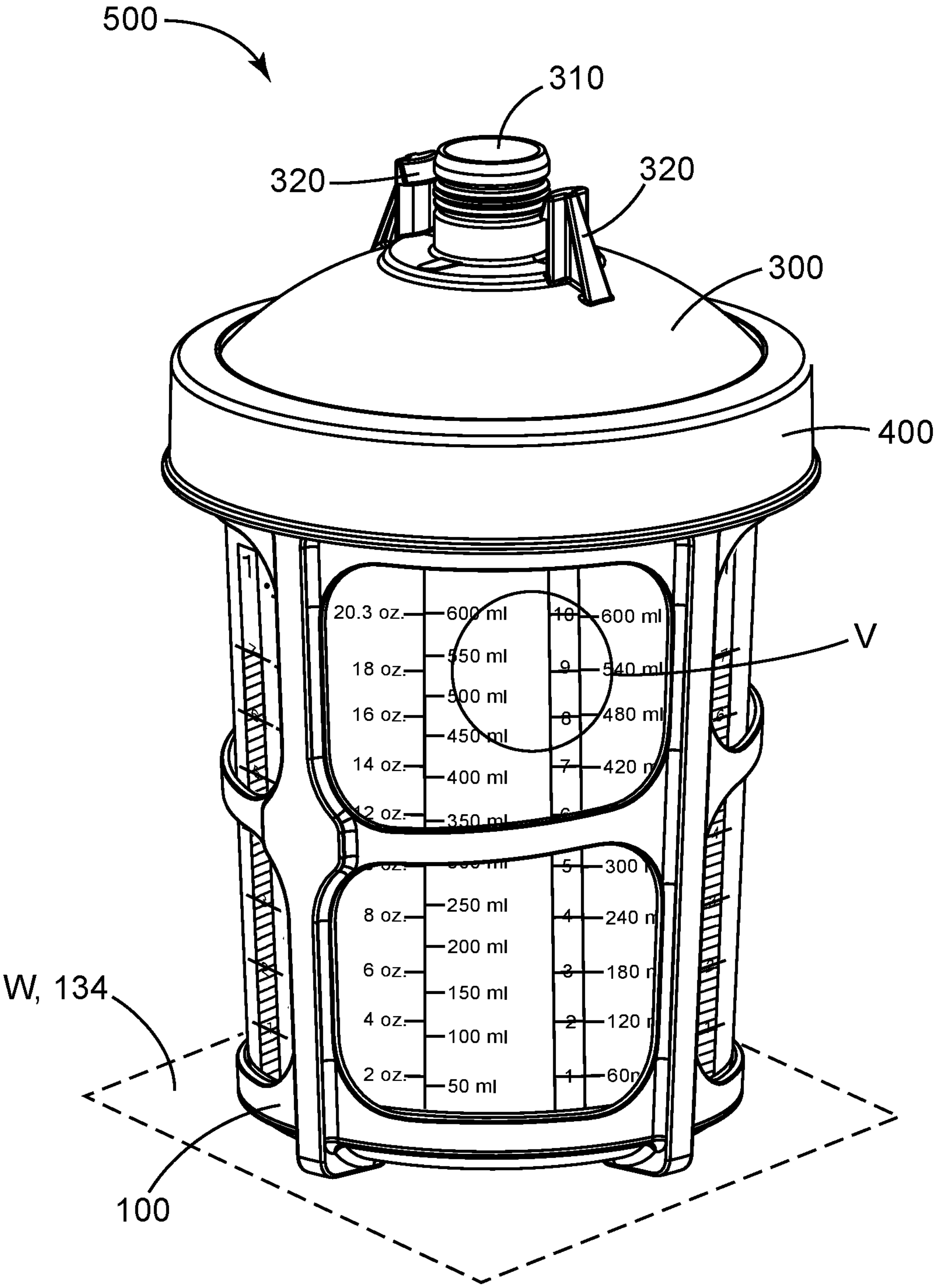
FIG. 4B is an isometric view of an embodiment of a spray gun cup including volumetric indicia according to the present disclosure.

FIG. 4B depicts an embodiment as in FIG. 4A further including volumetric indicia V as described elsewhere herein.

Figure 4C:
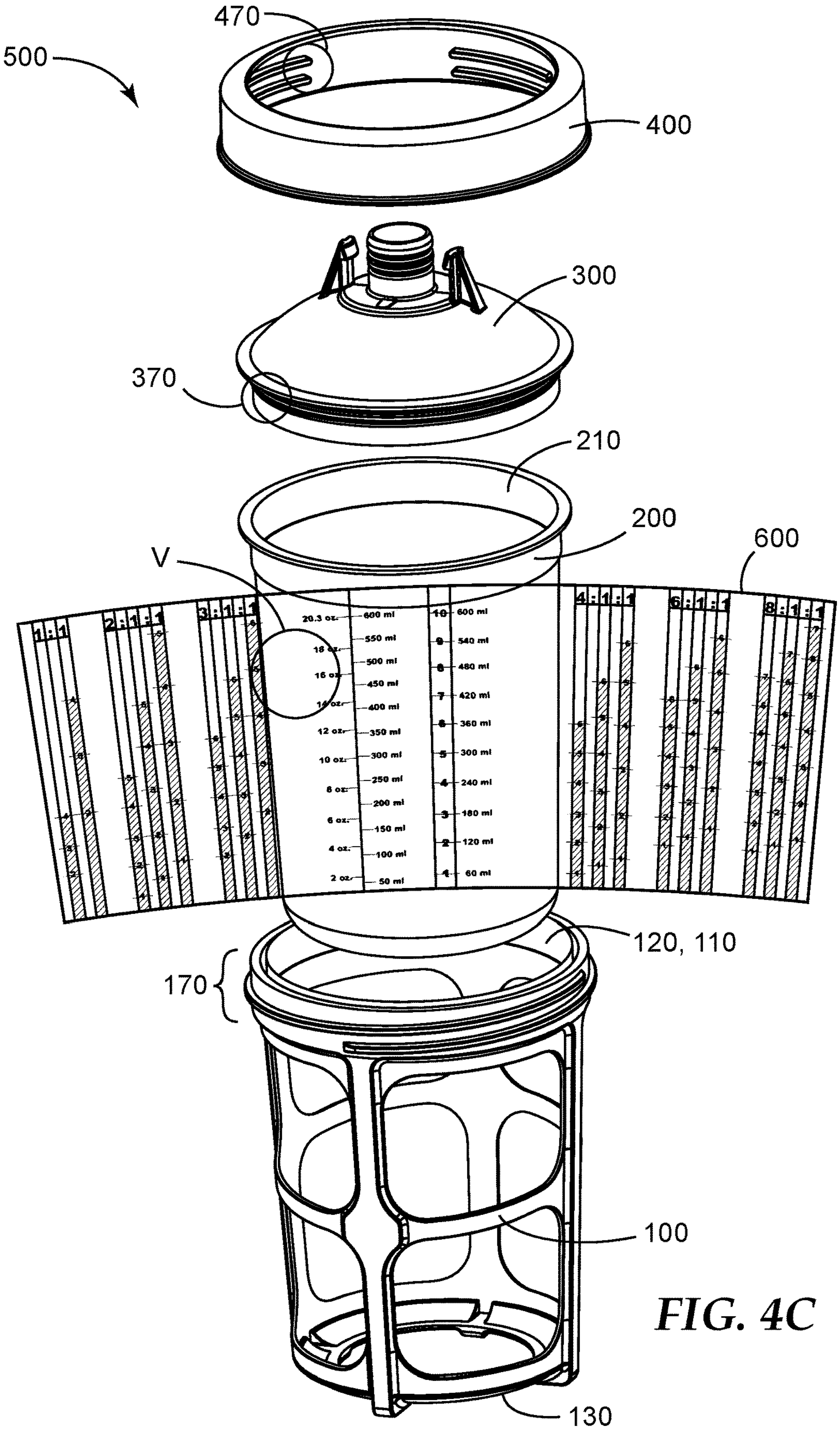
FIG. 4C is an exploded isometric view of an embodiment of a spray gun cup including an insert comprising volumetric indicia according to the present disclosure.

FIG. 4C depicts an exploded view of a spray gun cup 500 including volumetric indicia provided on an insert 600. As shown, it can be seen that the insert 600 may comprise a sheet that is deformable to the cavity of the spray gun cup receptacle upon insertion. Alternatively, an insert 600 could be provided as a pre-molded unit that could drop into the spray gun cup receptacle 100 without deformation.

An insert 600, or the corresponding receiving geometry of the spray gun cup receptacle 100, may be constructed such that the insert 600 is registered in the cavity and with respect to the apertures and thus generally fixed against rotation. In such an embodiment, the insert 600 may be provided as described above with repeating volumetric indicia "V" such that each liquid level is visible from at least one position about the spray gun cup receptacle. In some embodiments, the insert 600 may be registerable in more than one location such that the insert can be inserted and fixed in more than one position.

Figure 4D:
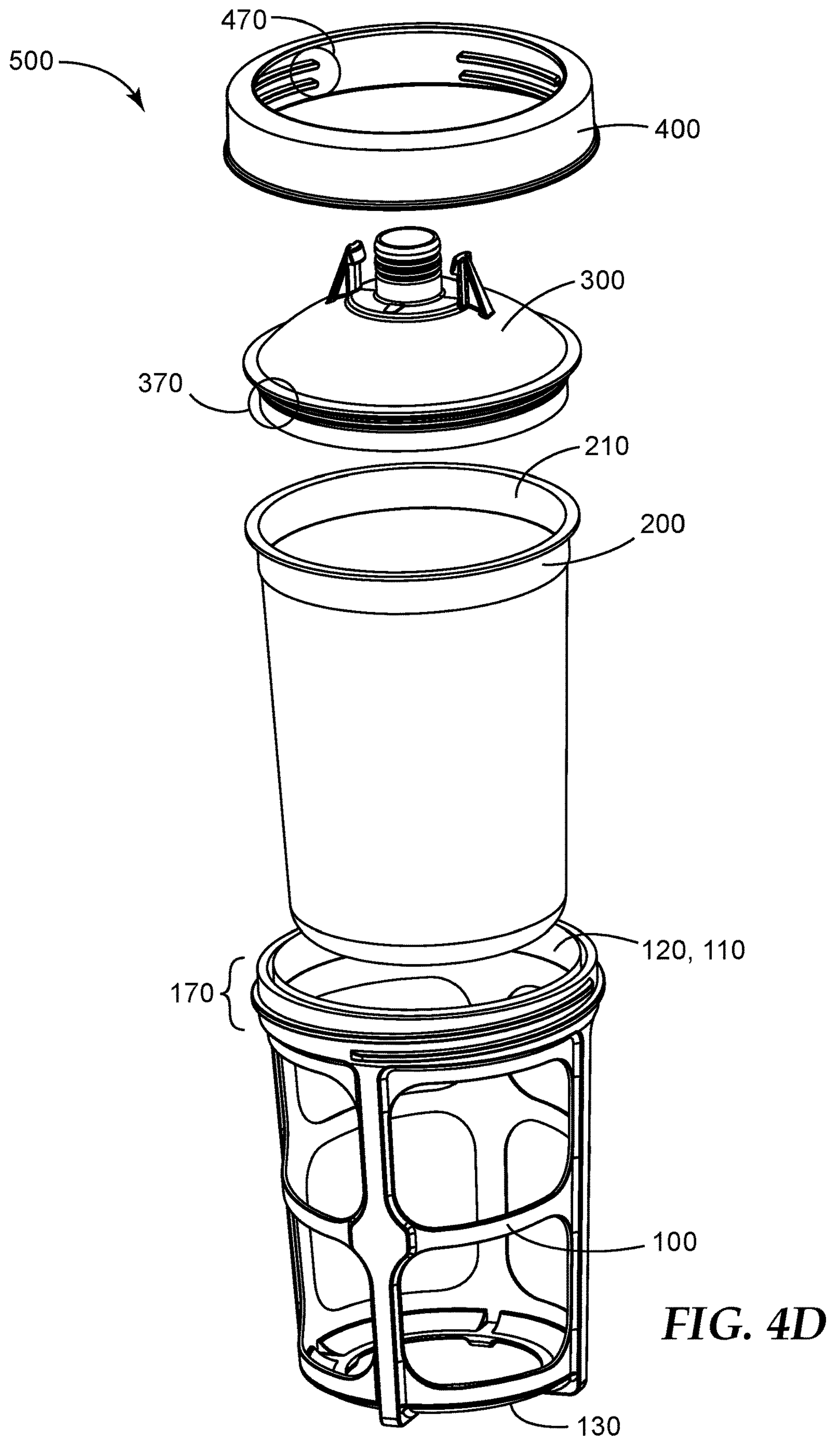
FIG. 4D is an exploded isometric view of an embodiment of a spray gun cup according to the present disclosure.

FIG. 4D depicts an exploded view of a spray gun cup 500 not including volumetric indicia V, but wherein the contents of the cavity are nonetheless visible at all fluid levels through at least one aperture as described elsewhere herein. In order that the contents of a liner 200—when provided—are visible, the liner is generally constructed from a transparent or translucent material.

Figure 5A:
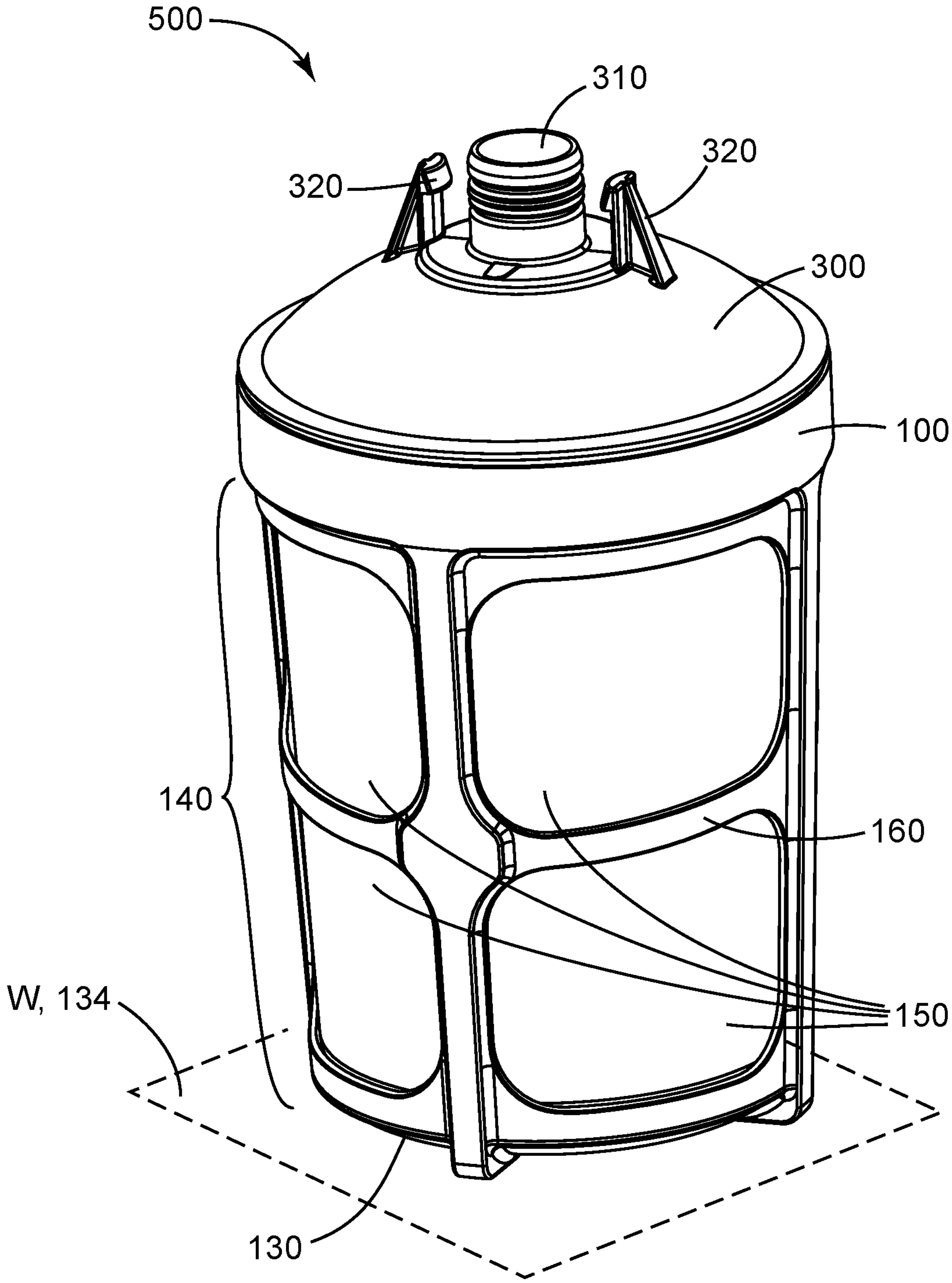
FIG. 5A is an isometric view of an embodiment of a spray gun cup according to the present disclosure.

FIG. 5A depicts a spray gun cup 500 different from the one depicted in FIG. 4A in that no collar 400 is used. Rather, the lid member 300 is adapted to be secured without the need of a collar. The lid member 300, while otherwise configured as described above, may be provided with lid connection structure 370 that may have alternatively been provided on a collar 400. For example, the lid member 300 may itself screw directly (via lid connection structure 370) into—or on to, or both—the spray gun cup receptacle 100. Alternatively (or in combination), the lid member 300 could comprise lid connection structure 370 to compliment receptacle connection structure 170 as previously discussed with respect to FIG. 1A (e.g., a snap-fit connection, a push-fit connection, a twist-lock connection, a clip connection, a latch connection, a hinged connection, or combinations thereof).

Figure 5B:
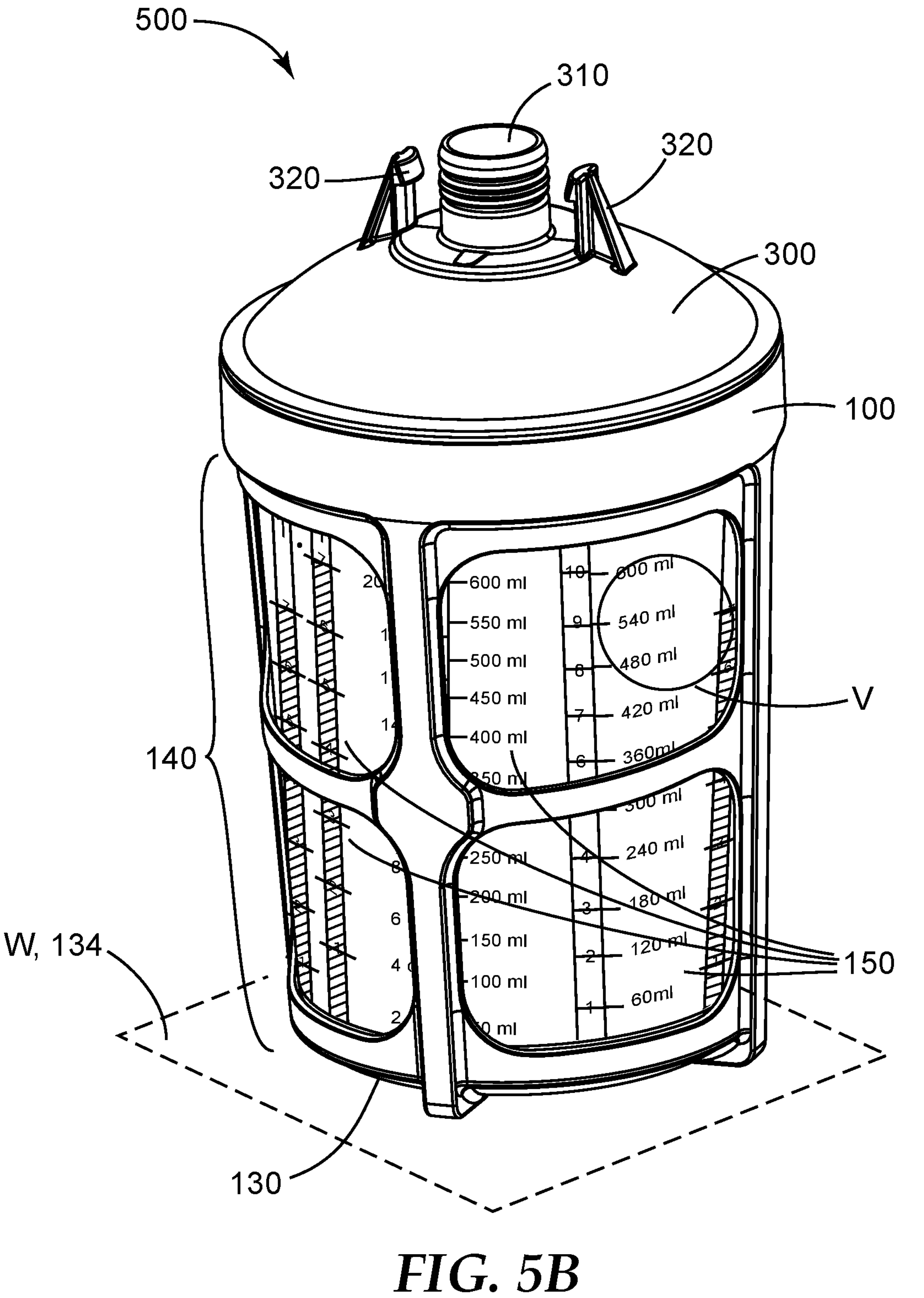
FIG. 5B is an isometric view of an embodiment of a spray gun cup including volumetric indicia according to the present disclosure.

FIG. 5B depicts an embodiment as in FIG. 5A further including volumetric indicia V as described elsewhere herein.

Figure 5C:
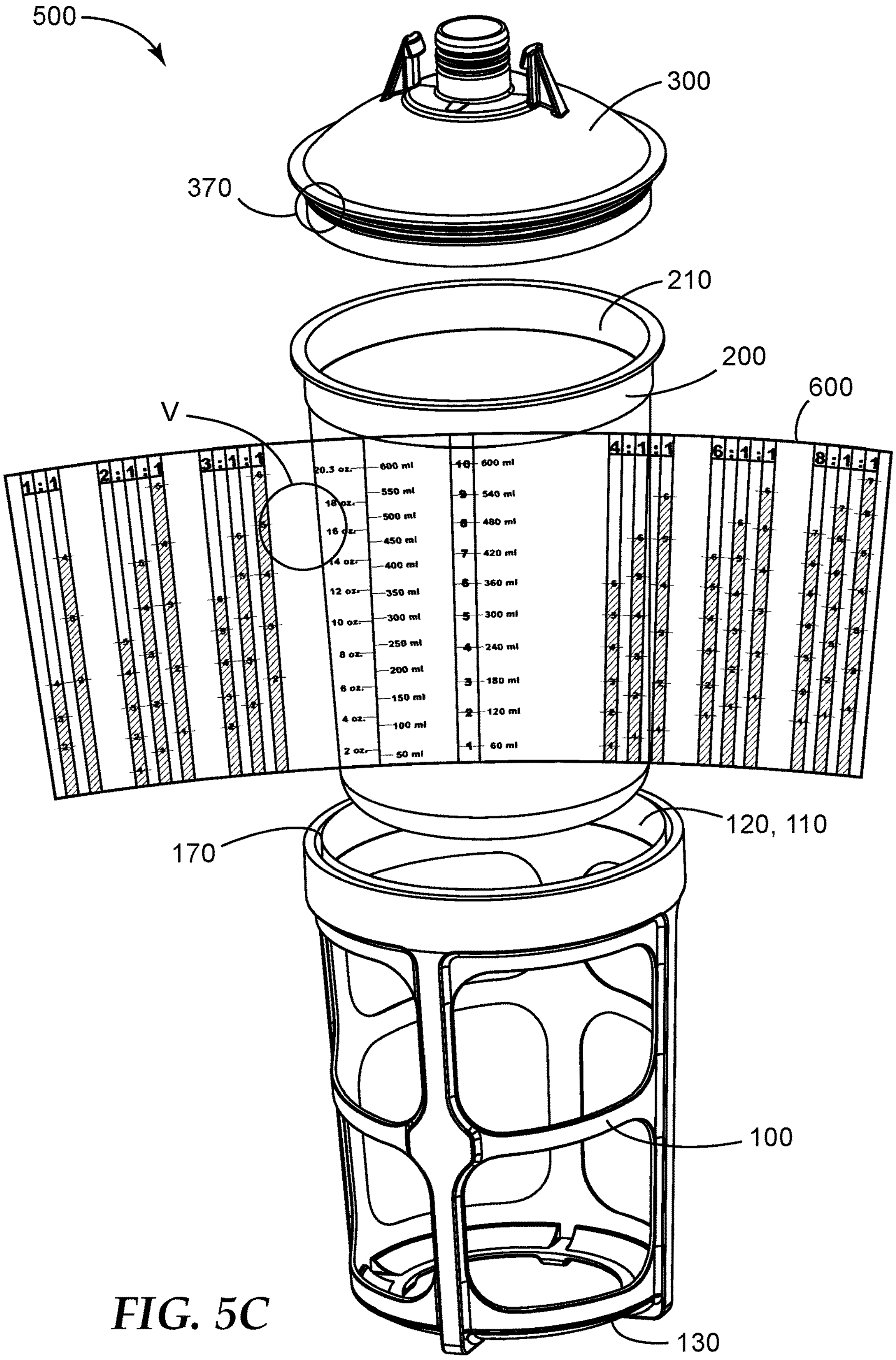
FIG. 5C is an exploded isometric view of an embodiment of a spray gun cup including an insert comprising volumetric indicia according to the present disclosure.

FIG. 5C depicts an exploded view of a spray gun cup 500 including volumetric indicia provided on an insert 600. As shown, it can be seen that the insert 600 may comprise a sheet that is deformable to the cavity of the spray gun cup receptacle 100 upon insertion. Alternatively, an insert 600 could be provided as a pre-molded unit that could drop into the spray gun cup receptacle 100 without deformation.

Figure 5D:
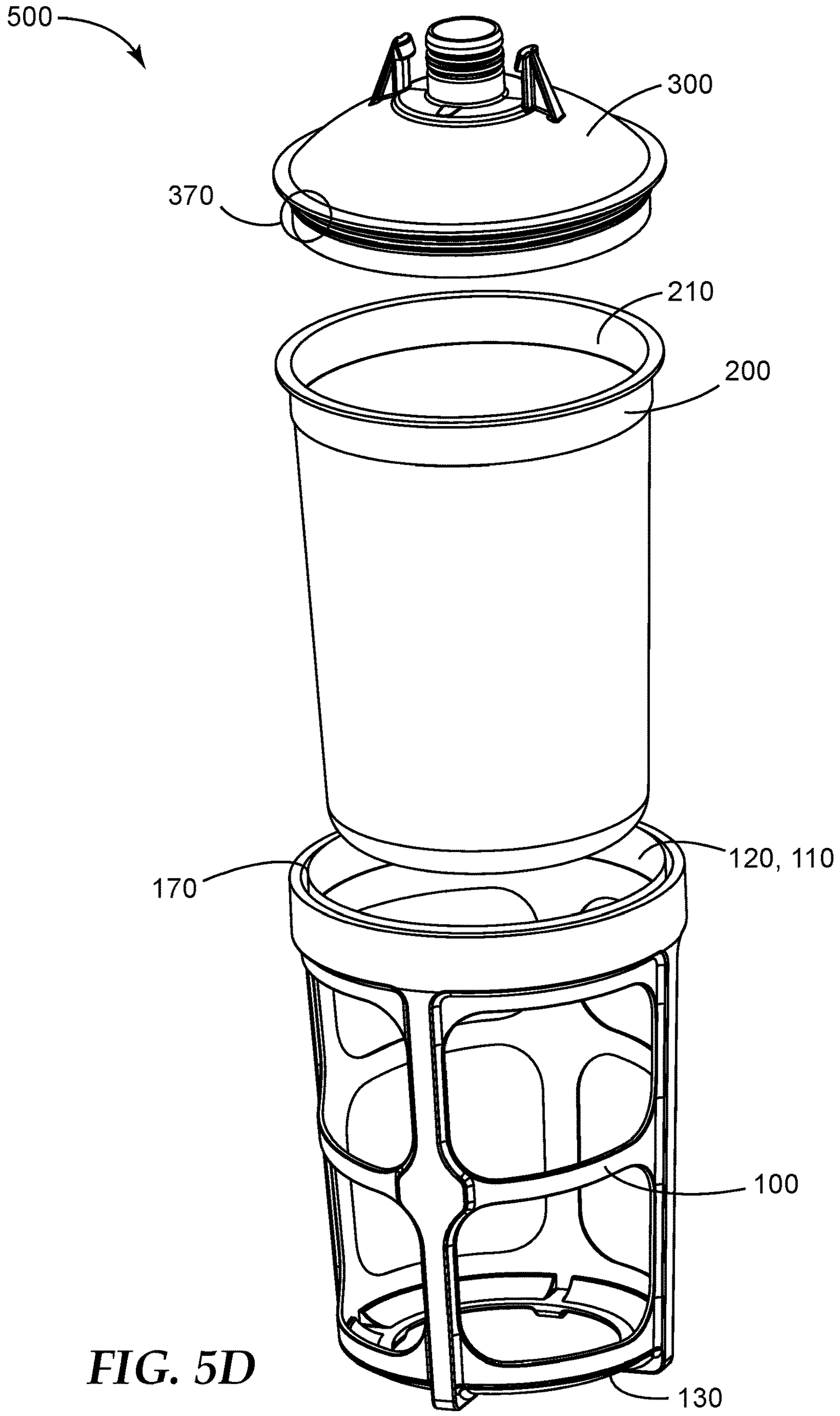
FIG. 5D is an exploded isometric view of an embodiment of a spray gun cup according to the present disclosure.

FIG. 5D depicts an exploded view of a spray gun cup 500 not including volumetric indicia, but wherein the contents of the cavity are nonetheless visible at all fluid levels through at least one aperture as described elsewhere herein. As shown in both FIGS. 5C and 5D, the lid connection structure 370 comprises a snap-fit connection with complimentary receptacle connection structure 170. In order that the contents of a liner 200—when provided—are visible, the liner is generally constructed from a transparent or translucent material.

Figure 6:
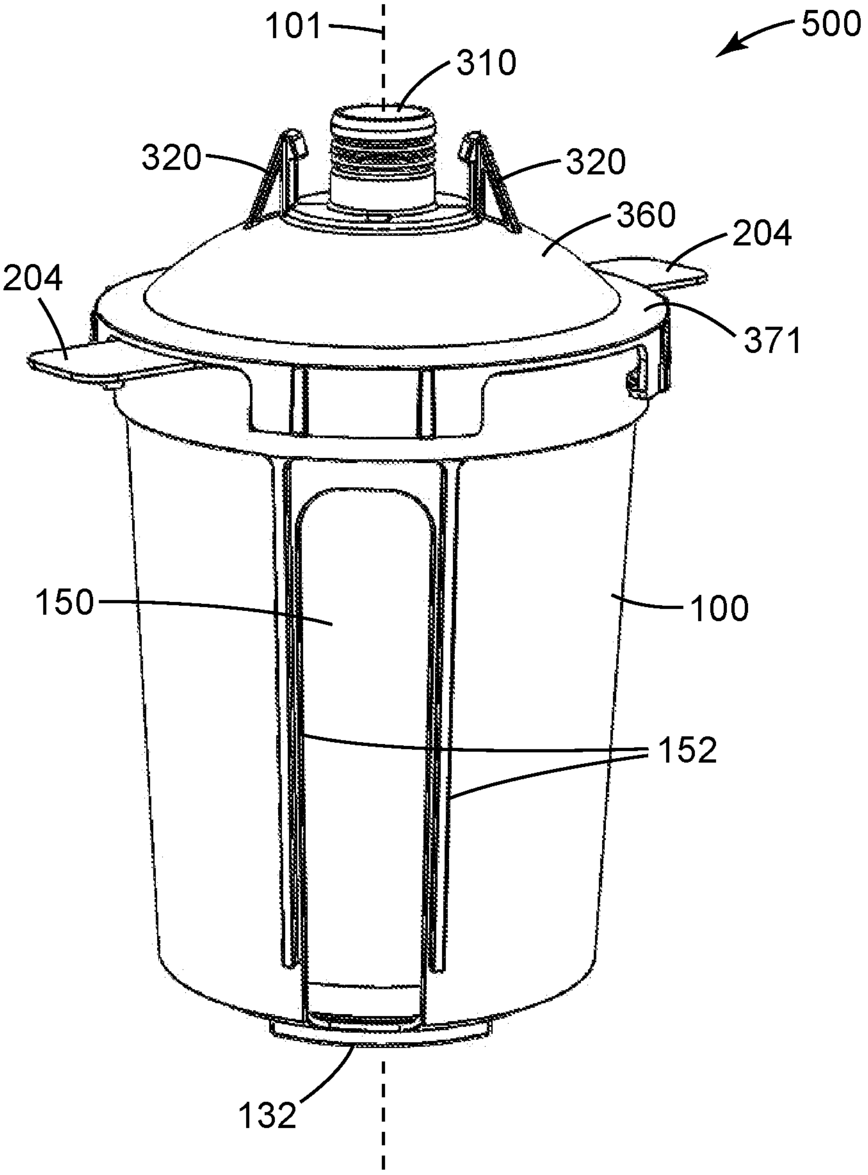
FIG. 6 is an isometric view of an embodiment of a spray gun cup according to the present disclosure.
Figure 7:
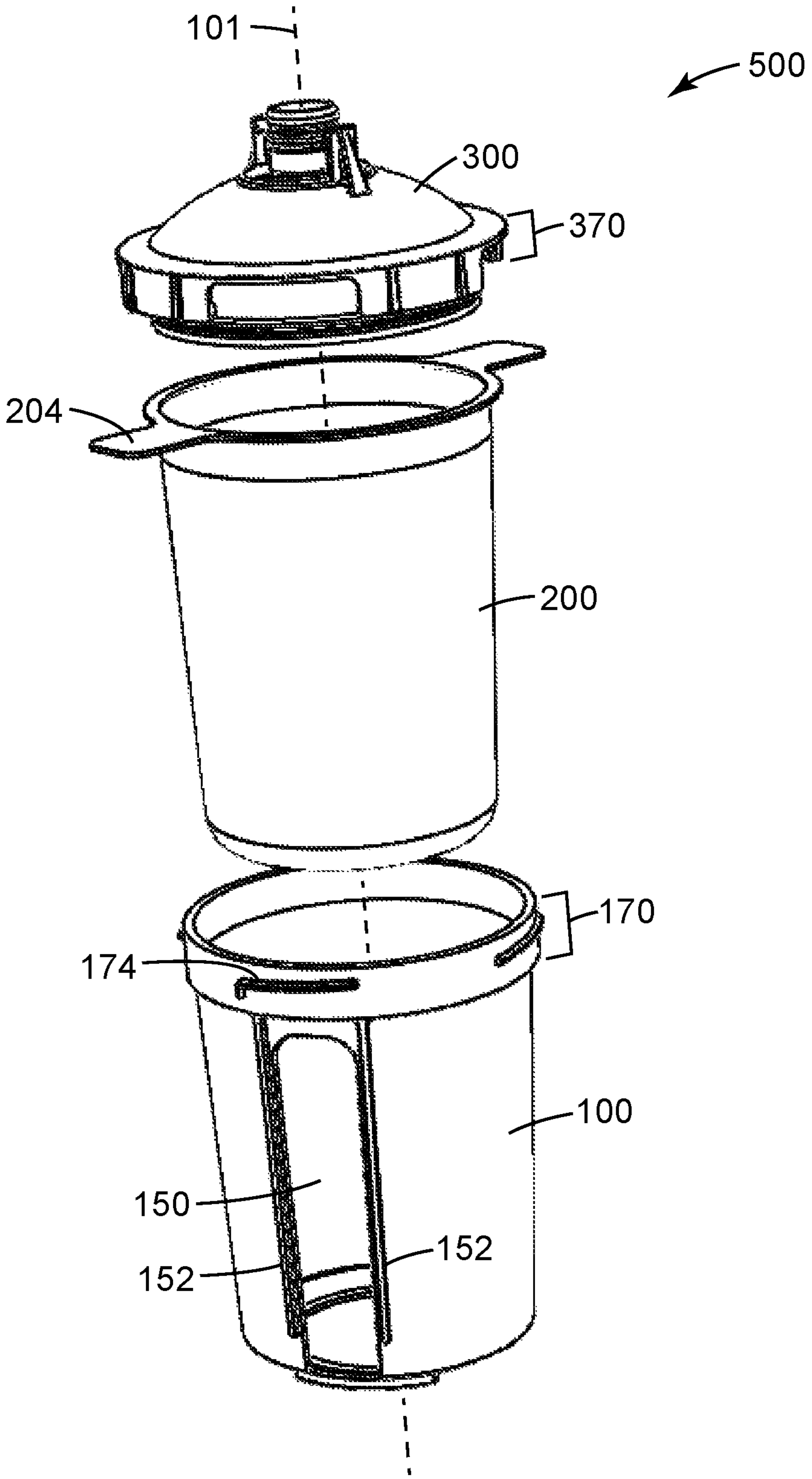
FIG. 7 is an exploded isometric view of the spray gun cup of FIG. 6.
Figure 8:
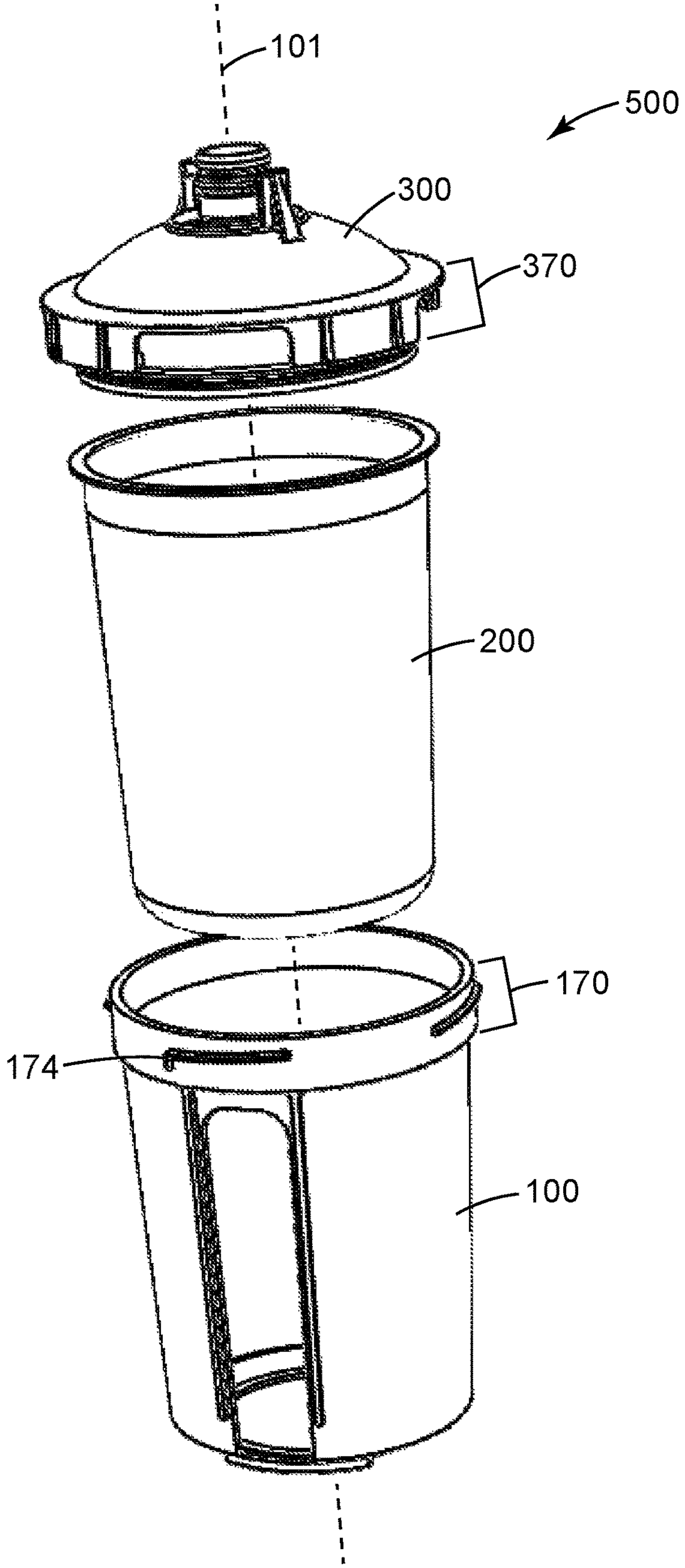
FIG. 8 is an exploded isometric view of an alternative embodiment of the spray gun cup of FIG. 6 wherein the liner is shown without removal features.
Figure 9A:
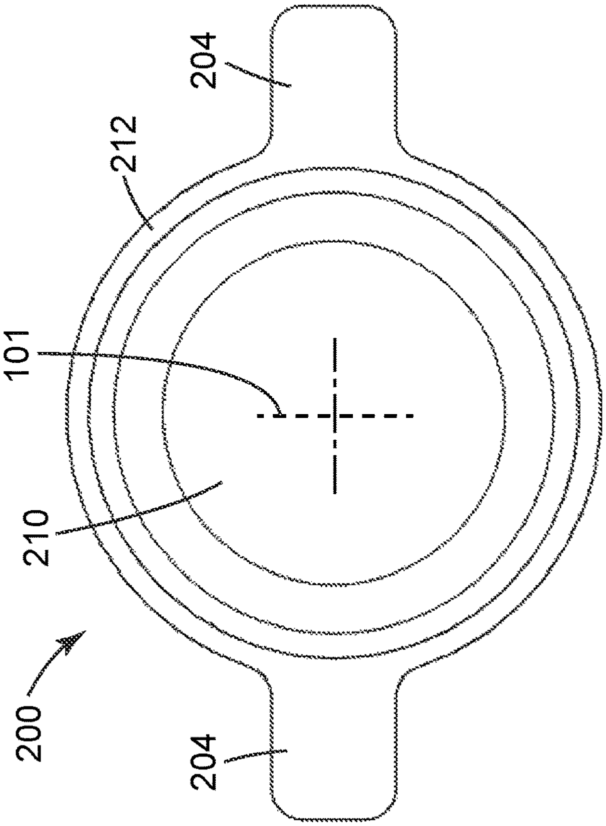
FIG. 9A is a top view of the liner of FIG. 9.
Figure 9:
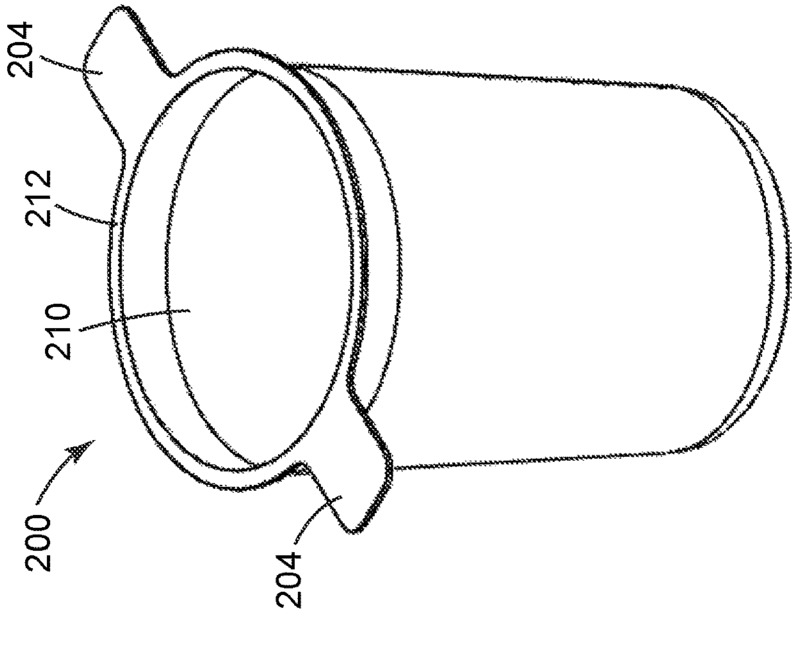
FIG. 9 is an isometric view of an embodiment of a liner according to the present disclosure.
Figure 10A:
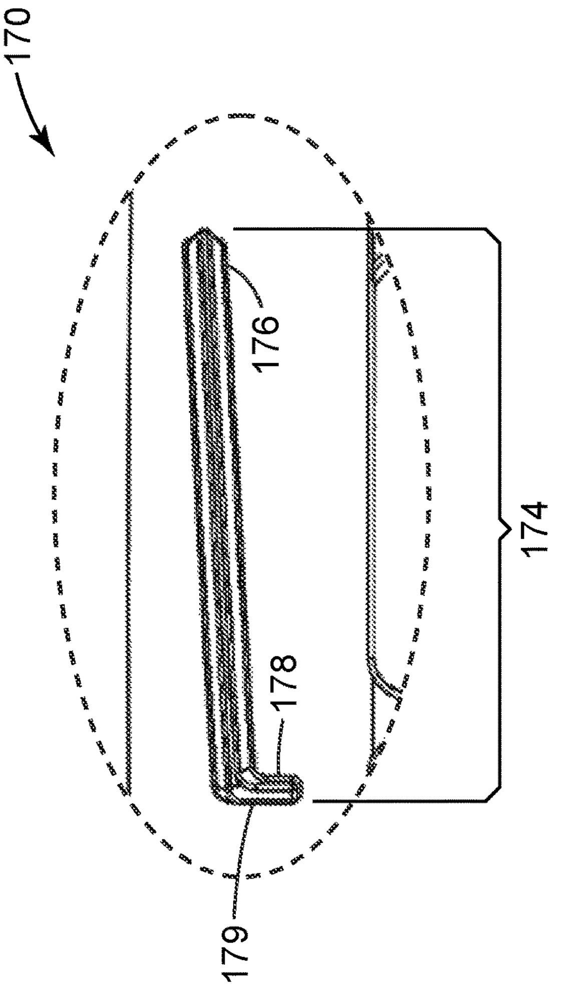
FIG. 10A is a detailed front view of the spray gun cup receptacle of FIG. 10 detailing a quick-start thread feature.
Figure 10:
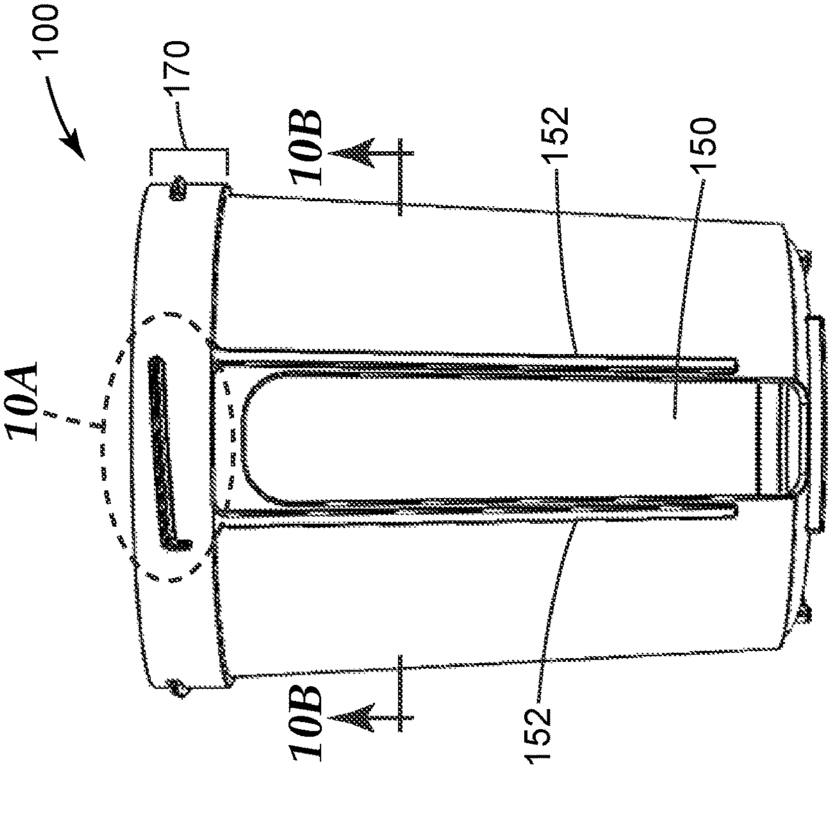
FIG. 10 is an isometric view of an embodiment of a spray gun cup receptacle according to the present disclosure.
Figure 10B:
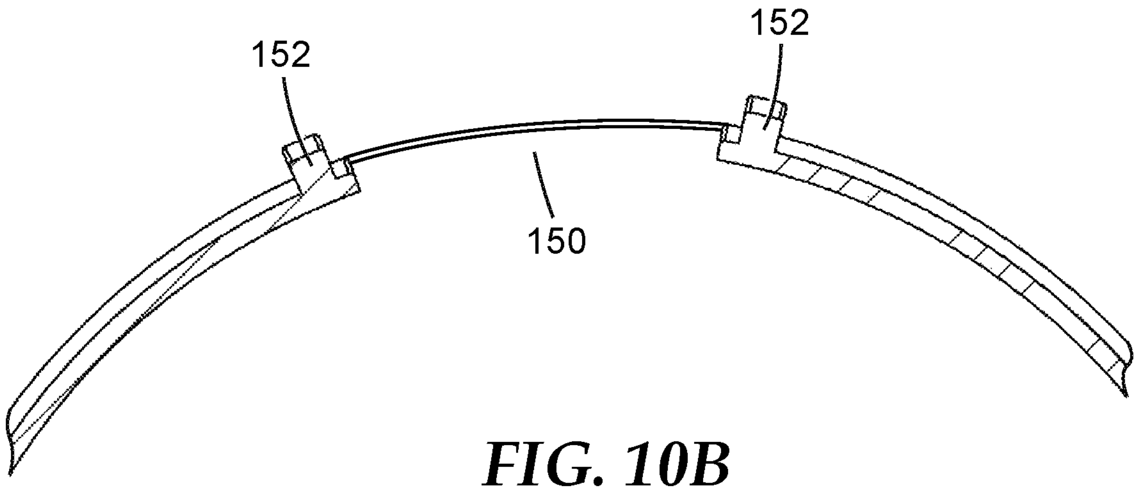
FIG. 10B is a detailed cross-section view taken at 10B-10B of FIG. 10.

FIGS. 6 through 8 depict additional embodiments of a spray gun cup 500 that, like the embodiments of FIGS. 5A-5D, have a lid 300 connected directly to the receptacle connection structure 170 without the need of a separate collar 400. An exemplary liner for use with such a spray gun cup 500 is shown in FIGS. 9-9A, while an exemplary spray gun cup receptacle is shown in FIGS. 10-10A, and various exemplary embodiments of lids 300 are depicted in FIGS. 11-16B.

In the embodiment depicted in FIG. 6, the spray gun cup receptacle 100 comprises one or more apertures 150. Although such apertures 150 could be provided in the manner described above (i.e., intersected by one or more brace members), no brace members are shown here. Adjacent the aperture(s), there are provided one or more tactile feedback members 152 that are proud of the outer wall 104 of the spray gun cup receptacle 100. Alternatively, a tactile feedback member 152 may be provided as a recess in the outer wall 104, or, e.g., as a texture on the outer wall 104. The tactile feedback member(s) allow a user to know, without looking at the spray gun cup 500, that they are gripping an area adjacent an aperture, such that they can properly locate their hand(s) and avoid inadvertently applying excess pressure (such as by squeezing) to the liner 200 through the aperture(s). It has been found that squeezing the liner 200 when it is filled with paint can cause spilling of paint (by forcing paint upward an out of the open end 210 of the liner 200 or accidental disconnection of the lid 300 from the liner 200 through excess deformation of the open end 210 of the liner 200.

While the exemplary spray gun cup receptacles shown in FIGS. 6-16B comprise a different configuration of aperture as compared to FIGS. 1-5D, it should be understood that any of the lids 300 and spray gun cup receptacles 100 described herein could be used with one another provided any necessary modifications are made to the respective receptacle, lid, and/or optional collar connection structures (170, 370, 470, respectively).

FIGS. 11-16B depict various exemplary embodiments of lids useful with spray gun cup 500 receptacles described herein. As can be seen in, e.g., FIGS. 11A and 11C, the lid 300 may comprise one or more liner sealing members 340. A liner sealing member 340, when provided, functions as follows: a liner 200 is inserted into the open end 110 of a spray gun cup receptacle 100; paint is added through the open end 110 of the liner 200; a lid 300 it positioned in the open end 110 of the liner 200 (and receptacle); the lid 300 is secured to the receptacle in a direction along the central axis 101 such that the open end 110 of the liner 200 is stretched radially over the liner sealing member 340 and finally into full sealing engagement. A liner sealing member 340 may comprise one or more radially-outwardly protruding features, such as those shown in FIGS. 11-11E and 15-19. A liner sealing member may additionally (or alternatively) comprise a chamfered or otherwise tapered surface, such as those shown in FIGS. 12-14A.

Figure 11:
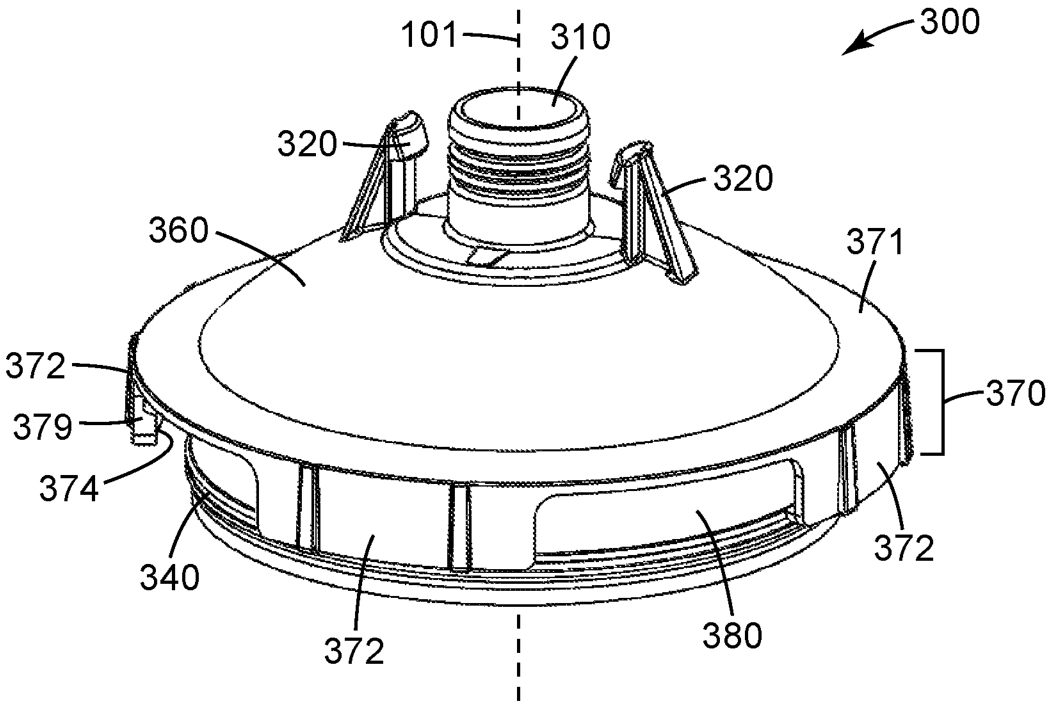
FIG. 11 is an isometric view of an embodiment of a lid according to the present disclosure.
Figure 12:
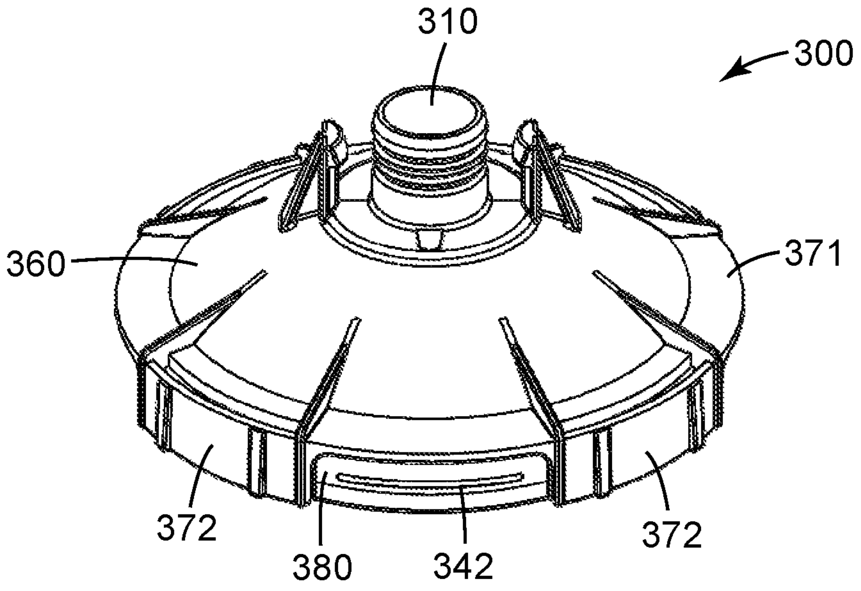
FIG. 12 is an isometric view of an embodiment of a lid according to the present disclosure.
Figure 12A:
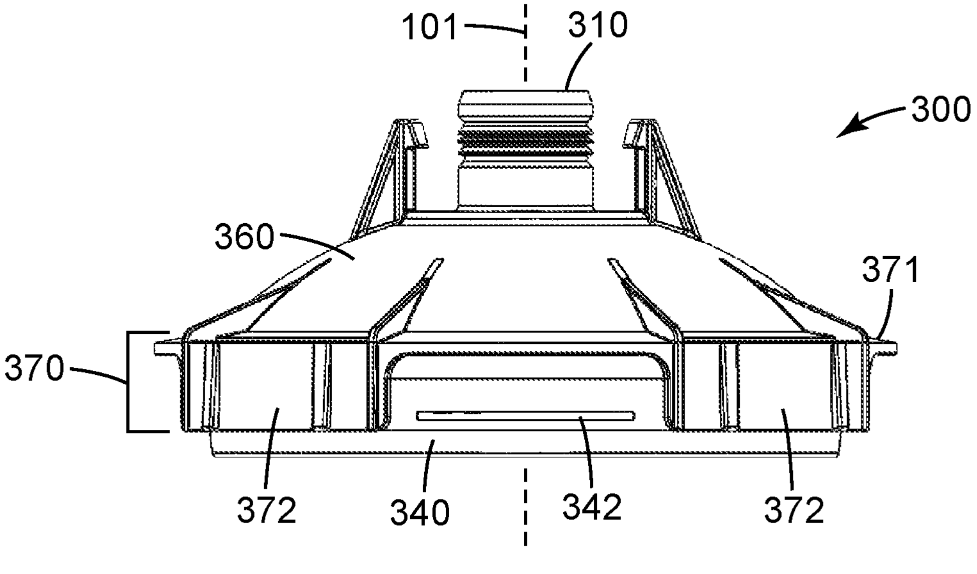
FIG. 12A is a front view of the lid of FIG. 12.
Figure 13:
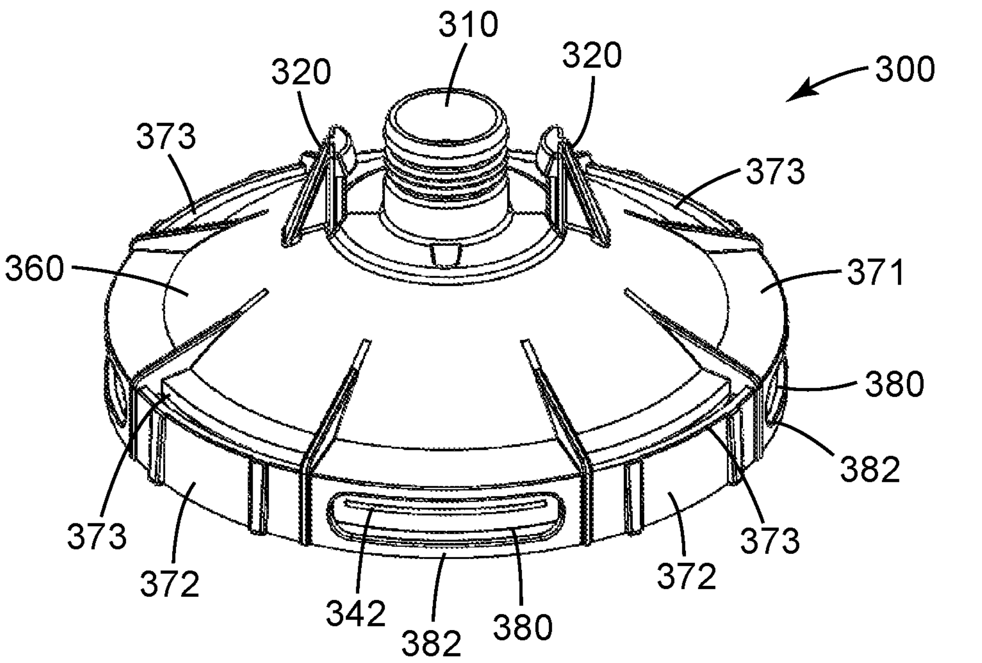
FIG. 13 is an isometric view of an embodiment of a lid according to the present disclosure.
Figure 13A:
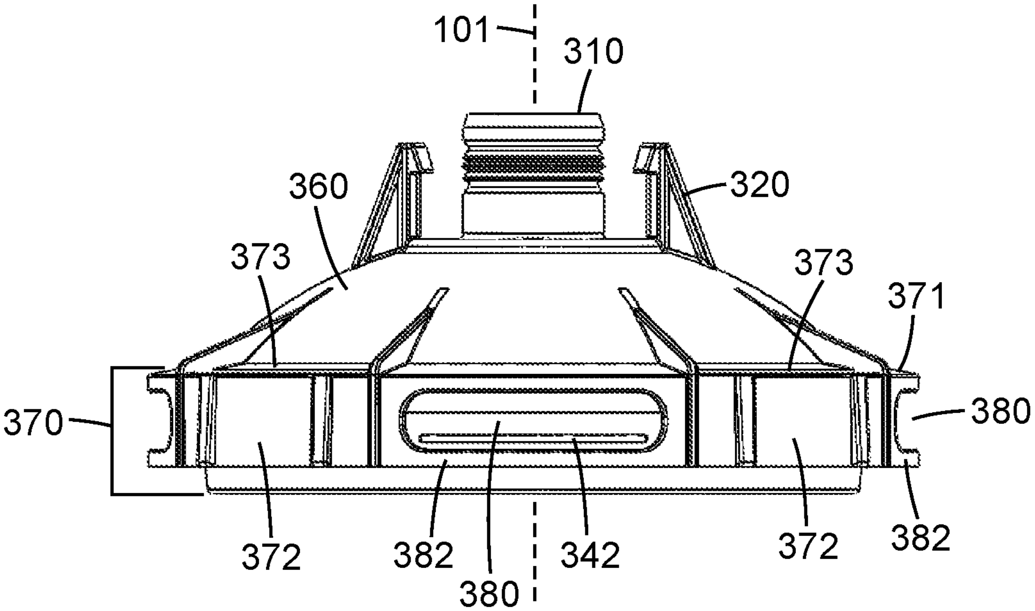
FIG. 13A is a front view of the lid of FIG. 13.

The lid 300 may further comprise a liner seal catch 342, an example of which is most clearly depicted in FIGS. 12-13A. A liner seal catch 342 can enhance liner retention on the lid 340 and, some embodiments can assist in providing tactile and/or audible reassurance to the end user that the lid 300 is securely seated in the liner 200 by permitting a "snapping" action as discussed in more detail elsewhere in this specification. A liner seal catch 342 is particularly suited for use in conjunction with a chamfered or otherwise tapered liner sealing member 340 as described above because such a tapered surface may lack other features that could assist in resisting against the liner 200 being pulled away from the lid (e.g., the radially-outwardly protruding features shown with the liner sealing member 340 in FIGS. 11-11E and 15-19). However, a liner seal catch 342 may be employed as additional support even in those constructions.

Although the entire spray gun cup 500 (or only the lid 300 and liner 200) may be discarded after use, users may wish to remove the liner 200 from the lid 300 either to add additional paint or to replace the lid 300 with a fresh one (e.g., when a filter 301 in the lid 300 has become clogged or when paint has dried thereon). However, it has been found that, because the liner is stretched to fully seal over the liner sealing member 340, a liner 200 can be difficult to remove from the lid 300 without damaging the liner 200 or spilling paint. Therefore, the liner 200 may be provided with one or more release tabs 204 that facilitate easy removal of the liner 200 from the lid 300 after assembly. These release tabs 204 are depicted in greater detail in FIGS. 7, 9, and 9A. FIG. 8 depicts an embodiment wherein the liner 200 optionally does not comprise release tabs 204.

The lid 300 may comprise a lid body 360 and be provided with a flange 371 about its periphery. In the depicted embodiments, the flange 371 carries at least a portion of the lid connection structure 370, and in particular the lid engagement member(s) 372. In some embodiments, one or more flange openings 380 are provided such that the flange 371 is interrupted about its periphery. The flange opening(s) 380 can allow clearance for the release tab(s) 204 on the liner 200 to extend from the spray gun cup 500 for convenient gripping and lifting of the liner 200. As shown, the flange opening(s) 380 penetrate the lid connection structure 370. Accordingly, adjacent the annular interruption(s) 304 are flange tabs 372 upon which are provided lid engagement members 374 to interact with complementary features on the receptacle connection structure 170. In some embodiments (see, e.g., FIGS. 12-13A) the presence of flange openings 380 can allow access for tooling (for example, injection molding tooling) to form a liner seal catch 342).

In the embodiment shown, the receptacle engagement member(s) 172 and lid engagement member(s) 372 comprise an easy-start partial thread whereby the lid 300 is easily aligned and attached to the receptacle 100 with a partial turn. A receptacle engagement member 174 comprising an easy-start partial thread is shown in greater detail in FIGS. 10 and 10A. As shown, the receptacle engagement member 174 comprises a camming surface 176 facing away from the open end 110 of the spray gun cup receptacle 100. The camming surface 176 may be linearly inclined, as shown, or may be flat (not inclined), curved, or may comprise any combination of inclined, flat, and/or curved portions. If entirely flat, an inclined or curved surface portion may be provided on the complementary lid camming surface 376 (described in greater detail elsewhere) such that a camming action is facilitated when the parts interact. Regardless of the particular configuration of the camming surface 176, it is adapted interact with complementary structure on the lid 300 to permit the lid 300 to be securely attached to the spray gun cup receptacle 100 such that the liner 200 is retained in sealing relation between the lid 300 and the receptacle.

It should be understood that, although features 176 and 376 are referred to as "camming surfaces," it is not strictly necessary for a camming action (which should be understood herein as including an application of force along the central axis) to occur during interaction. Rather, in some embodiments (see, e.g., the particular twist-lock embodiment described below), the respective lid and receptacle engagement members (374, 174), which may carry camming surfaces (376, 176) need not apply axial forces during installation and/or removal.

As shown, the receptacle engagement member 174 is additionally equipped with a stop feature 178 that prevents over-rotation of the lid 300 during installation and provides the user an indication that the lid 300 has been fully installed onto the spray gun cup receptacle (see, e.g., FIGS. 10-10A). A stop feature 178, when optionally provided, may be formed as a continuation of the camming surface 176 (as shown), or may be spaced from the camming surface 176. It has been found that the presence of a stop feature 178 can be especially beneficial on disposable (e.g., plastic) parts where over-rotation can cause deformation of engaging features and ultimately lead to potential failure of the connection.

In one embodiment, the lid engagement members 374 are adapted to align and cooperate with the receptacle engagement members 174 such that the lid 300 (*i*) can be "snapped" into the liner 200; (i) will not cross-thread; and (iii) will resist being rotated in the wrong direction at the beginning of assembly of the lid to the spray gun cup receptacle. To realize these benefits, a series of design features are employed (while all features are used together in the embodiments shown, they are not intended to be disclosed as inextricably linked, as each can provide benefits without the need of the other(s)).

One feature comprises spaces between adjacent receptacle engagement members 174 that permit a lid engagement member 374 to pass fully through until the lid is essentially fully seated against the spray gun cup receptacle (and/or liner 200)—although not yet fully sealed and tightened—prior to engagement of camming surfaces on either part. In this way, the lid can be "snapped" onto the liner in one brief motion, as opposed to, for example, advancing the two parts together gradually as a thread is tightened. The "snapping" sensation and/or sound derives from a combination of: (i) the liner sealing member(s) 340 being quickly advanced into the open end 210 of the liner 200 such that a portion of the liner 200 rapidly stretches over the liner sealing member 340 and then relaxes; and (ii) the lid rim 312 accordingly impacting the liner rim 212/receptacle rim 112 as the lid 300 quickly drops into contact. This brief snapping sensation can provide tactile and/or audible reassurance to the end user that the lid 300 and liner 200 are securely attached, although the lid has yet to be secured to the spray gun cup receptacle 100.

In embodiments where in the lid can be essentially fully seated in the liner 200 via a "snapping" action as described above, it may not be necessary to provide an additional camming action (e.g., by way of camming surface 176 and lid camming surface 376). Rather, sufficient retention of components may be achieved by a non-camming twist-lock connection. In such an embodiment, the end user would (i) align the respective lid and receptacle engagement members (374, 174); (ii) snap the lid into the liner; and (iii) twist the lid to engage the lid engagement member 374 against the receptacle engagement member 174 in a non-camming fashion, such that the respective engagement members prevent the lid from being pulled off the of the spray gun cup receptacle along the central axis, but don't necessary provide any compression of the lid 300 against the spray gun cup receptacle 100 or the liner rim 212.

Next, when the lid 300 is seated atop the spray gun cup receptacle 100 and installed to the liner 200, as described in the preceding paragraph, and before rotation to engage the easy-start partial thread, a rear portion 379 of a lid engagement member 374 is located at a vertical position along the central axis 101 that interferes with a forward portion 179 of the adjacent receptacle engagement member 174 such that the lid cannot be rotated in the reverse direction. Instead, the end user need only rotate the lid in the correct direction to finally lock the lid and liner against the spray gun cup receptacle 100.

Thus, the lid is (i) easily rotationally aligned; (ii) easily brought into the correct axial position against the spray gun cup receptacle; (iii) snapped in place to give reassurance of secure connection; (iv) prevented from rotating in the wrong direction; and (v) easily rotated in the correct direction without risk of cross-threading to engage respective camming surfaces to fully seal and tighten.

Provision of the receptacle engagement member(s) 172 as an easy-start partial thread as shown can not only make installation of the lid faster, but it can prevent possible cross-threading, reduce the number of areas where excess paint can collect and foul the assembly, and ease cleanup.

Figure 11A:
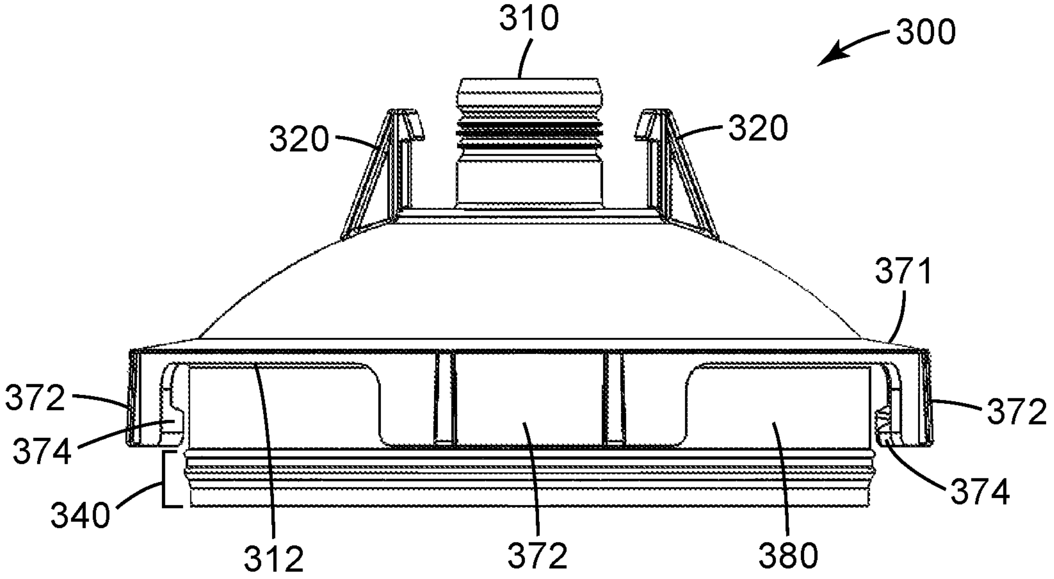
FIG. 11A is a front view of the lid of FIG. 11.
Figure 11B:
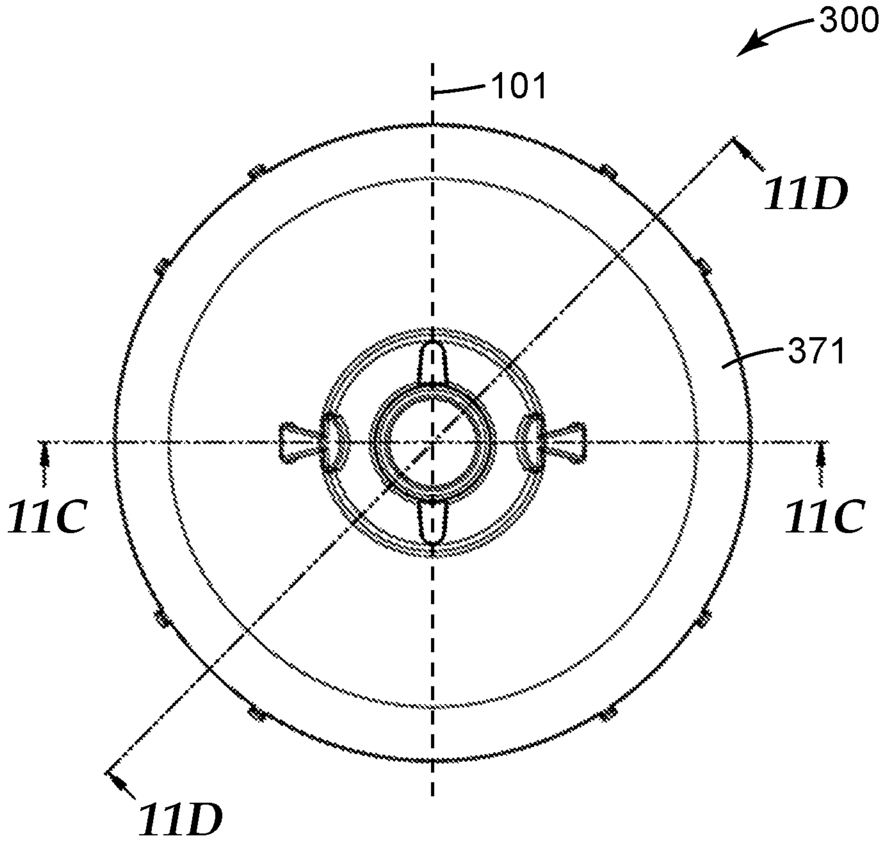
FIG. 11B is a top view of the lid of FIG. 11.
Figure 11C:
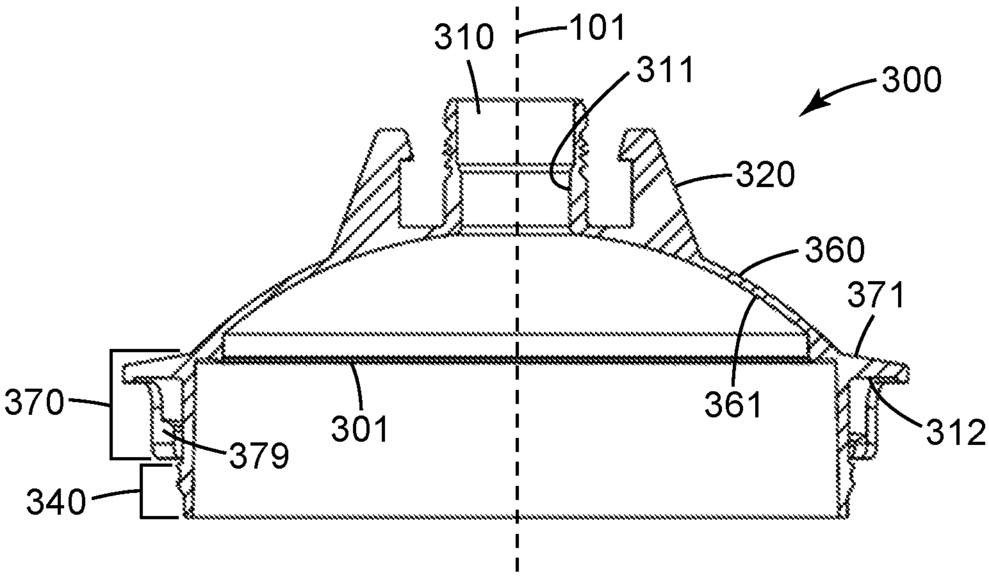
FIG. 11C is a cross-section view taken at c-c of FIG. 11B.
Figure 11D:
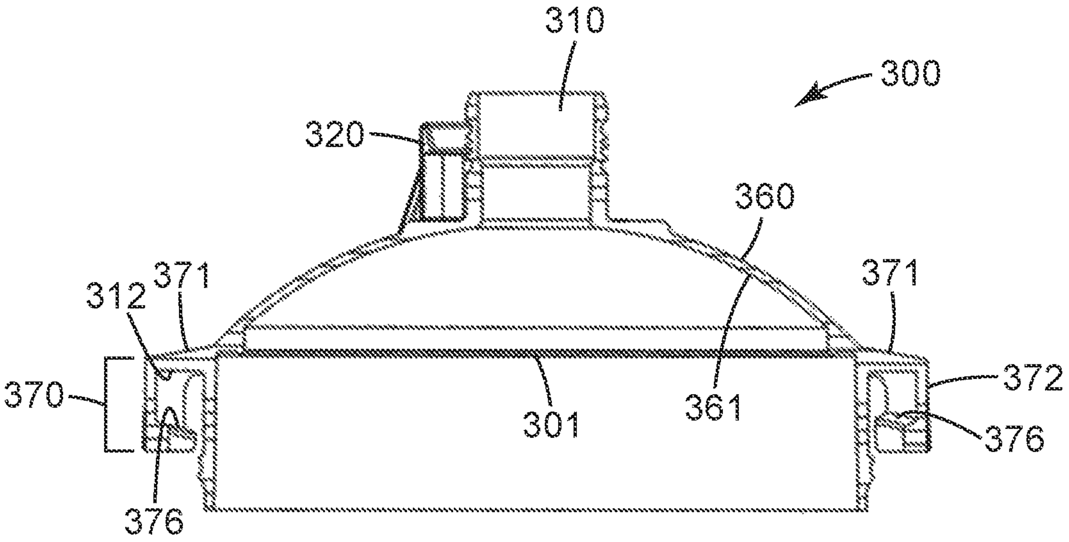
FIG. 11D is a cross-section view taken at d-d of FIG. 11B.
Figure 11E:
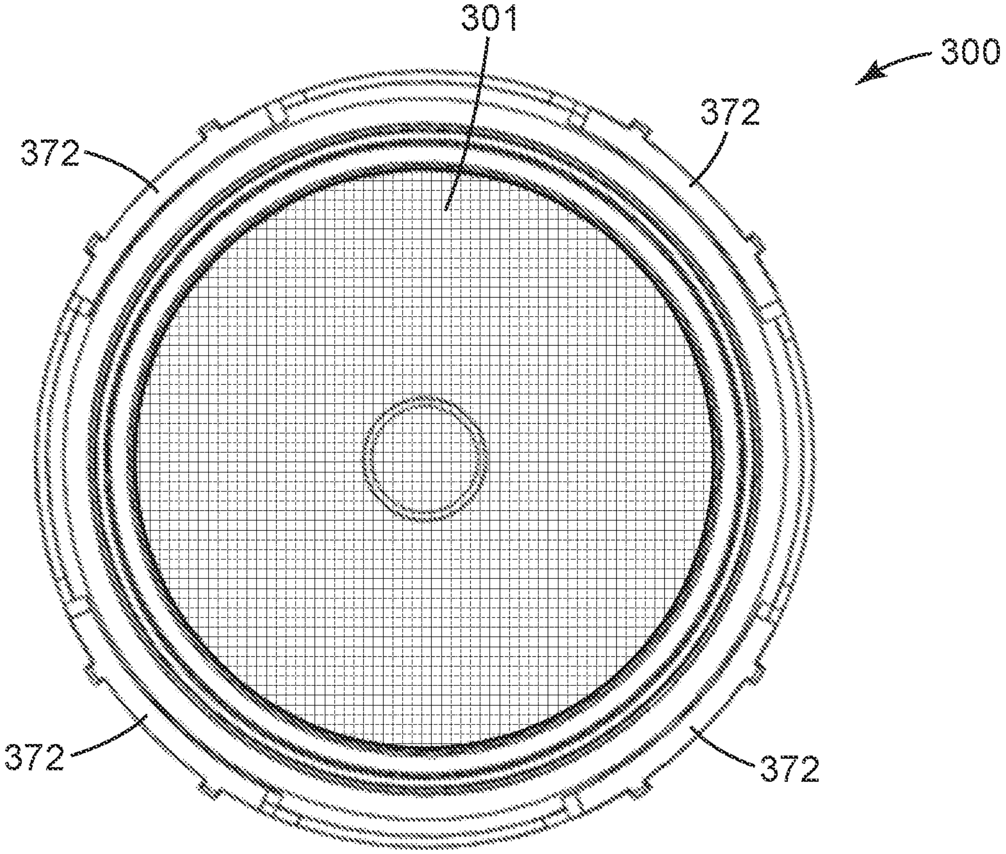
FIG. 11E is a bottom view of the lid of FIG. 11.
Figure 14:
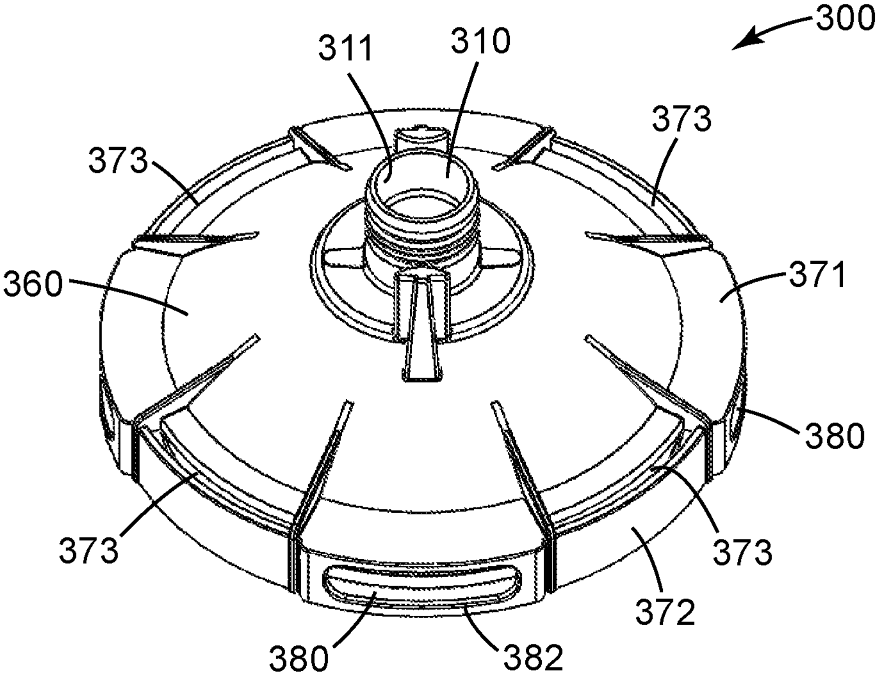
FIG. 14 is an isometric view of an embodiment of a lid according to the present disclosure.
Figure 14A:
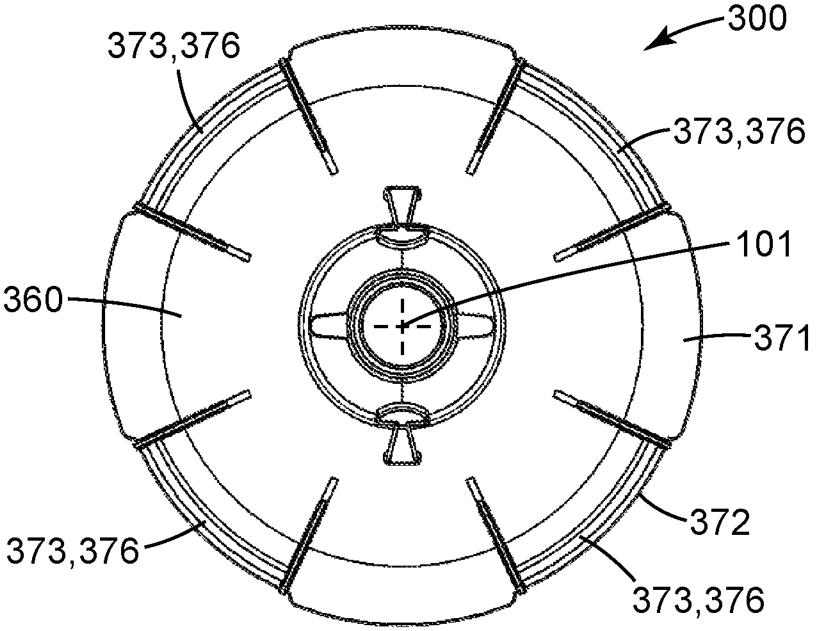
FIG. 14A is a top view of the lid of FIG. 14.

As shown in FIG. 11, for example, the lid comprises four flange tabs 372—one corresponding to each receptacle engagement member 174. The flange tabs 372 may be provided as independent members protruding along the central axis 101 from a radially-outer periphery of the lid 300, as shown for example in FIGS. 11-12E and 15-16B. Alternatively, as shown in FIGS. 13-14A, flange tabs 372 may be connected by flange bridging members 382. In either case, flange openings 380 may be provided in the area(s) between flange tabs 372. Flange openings 380 can permit clearance for, for example, liner release tabs 204 as discussed elsewhere, and may additionally provide access for the fingers of an end user to assist in gripping the lid 300 for installation and removal. Such additional gripping functionality may be particularly desirable where end users may be likely to be wearing gloves, and where the end user's hands (gloved or otherwise) may be slippery with wet paint.

In embodiments comprising a flange opening 380, an additional benefit may be realized in that an end user can more easily lift or pry the flange tab 372 upwardly if necessary to release the lid 300 from the spray gun cup receptacle. Such prying would require significantly greater force were the flange 371 not interrupted by flange openings 380. Such lifting or prying may be advantageous in embodiments where the lid 300 is a snap-fit or friction-fit onto the spray gun cup receptacle 100, but may also be useful in removing a lid 300 that has been threaded in place (for example, if a spill or excess paint has dried in the assembly, making removal by turning difficult). It should be noted that such lifting or prying functionality is likely best achieved without a bridging member 382, it could be facilitated even with a bridging member 382, so long as each flange tab 372 is nevertheless able to lift sufficiently independently of each other flange tab 372.

In some embodiments (see, e.g., FIGS. 12-14A) one or more access windows 373 are provided in the flange 371 corresponding to the lid engagement member(s) 374. The access window(s) 373 can provide access by slides in injection-molding tooling for formation of features that would otherwise be underlying the flange tabs 372—for example, the lid camming surface(s) 376 on lid engagement member(s) 374. For example, as shown in FIG. 14A, the lid camming surfaces 376 are visible through the access windows 373 looking from the top of the lid 300.

Figure 15:
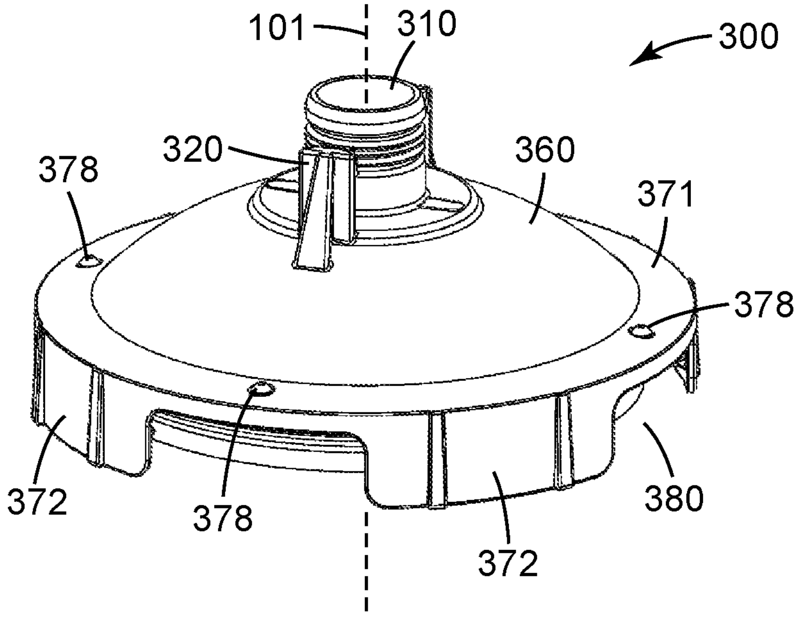
FIG. 15 is an isometric view of an embodiment of a lid according to the present disclosure.
Figure 15A:
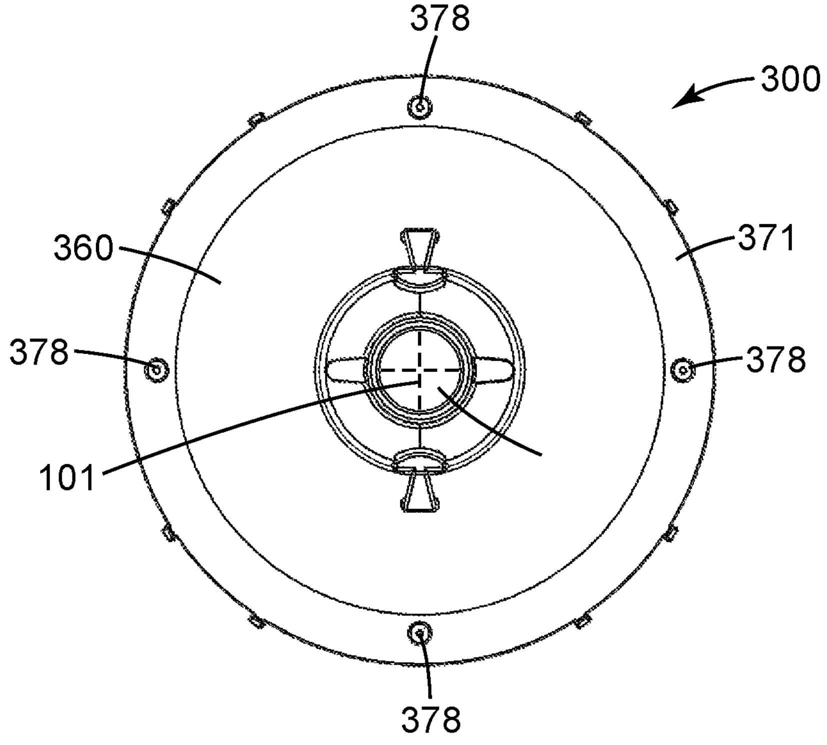
FIG. 15A is a top view of the lid of FIG. 15.
Figure 15B:
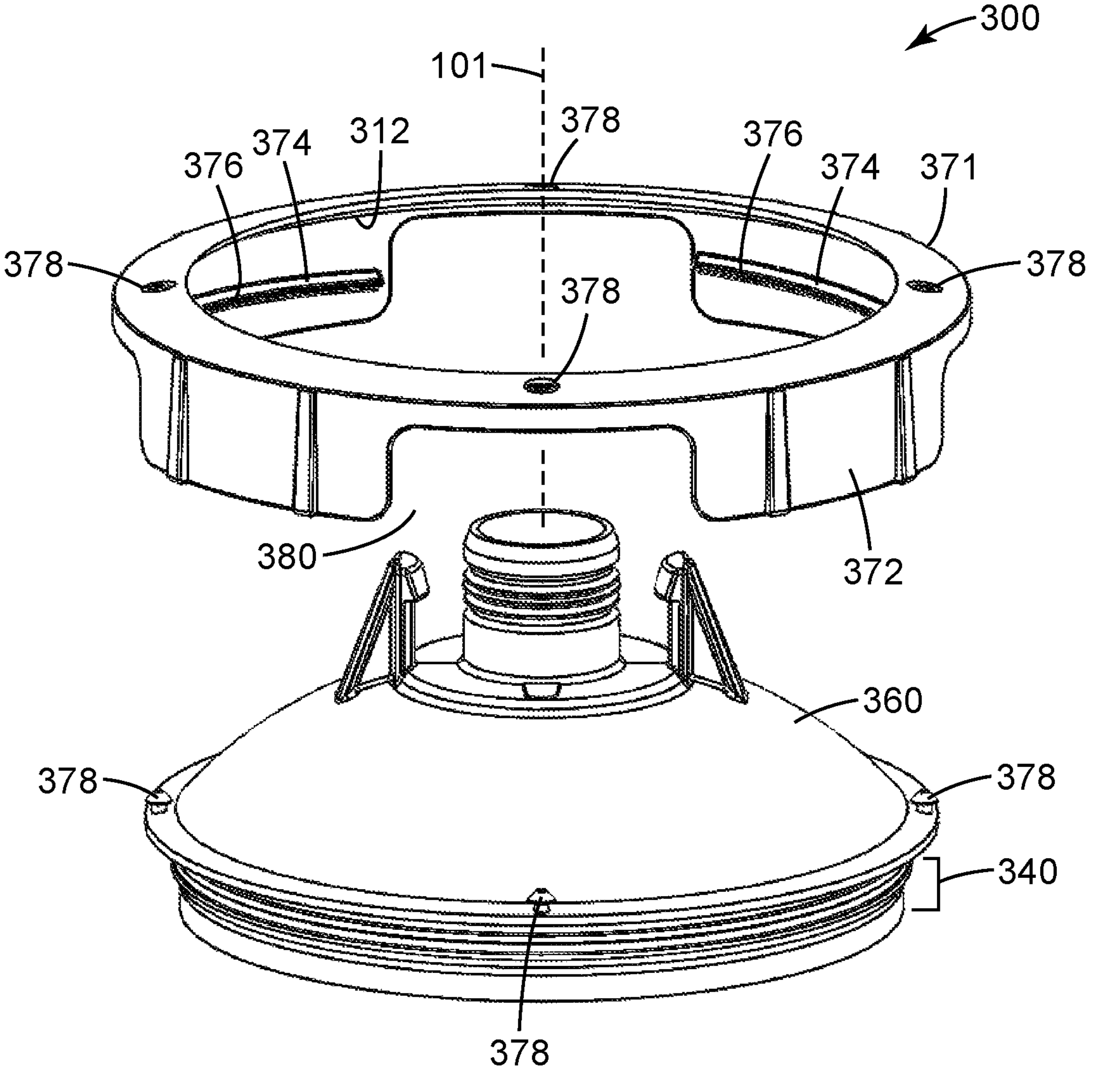
FIG. 15B is an exploded assembly view of the lid of FIG. 15.
Figure 16:
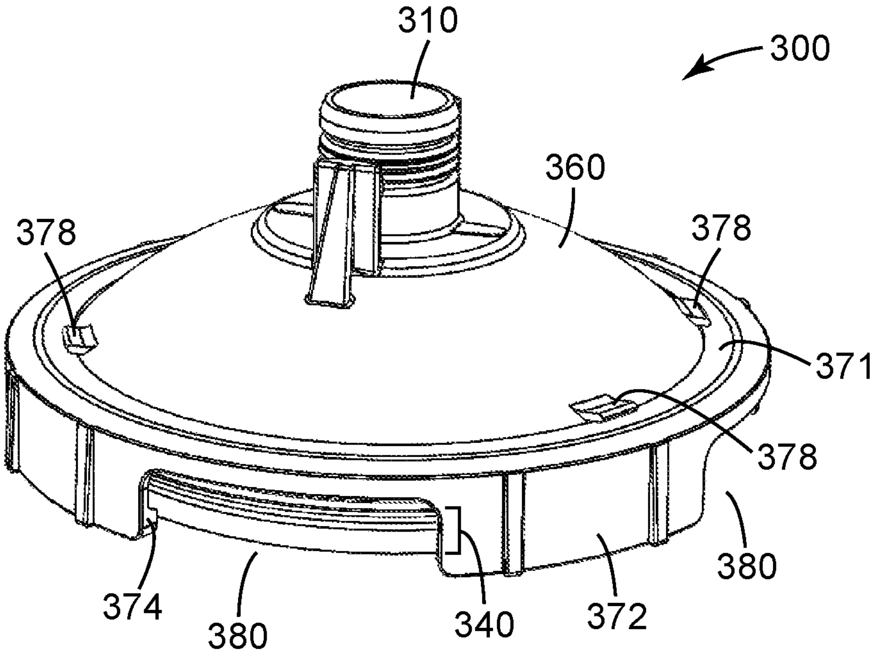
FIG. 16 is an isometric view of an embodiment of a lid according to the present disclosure.
Figure 16A:
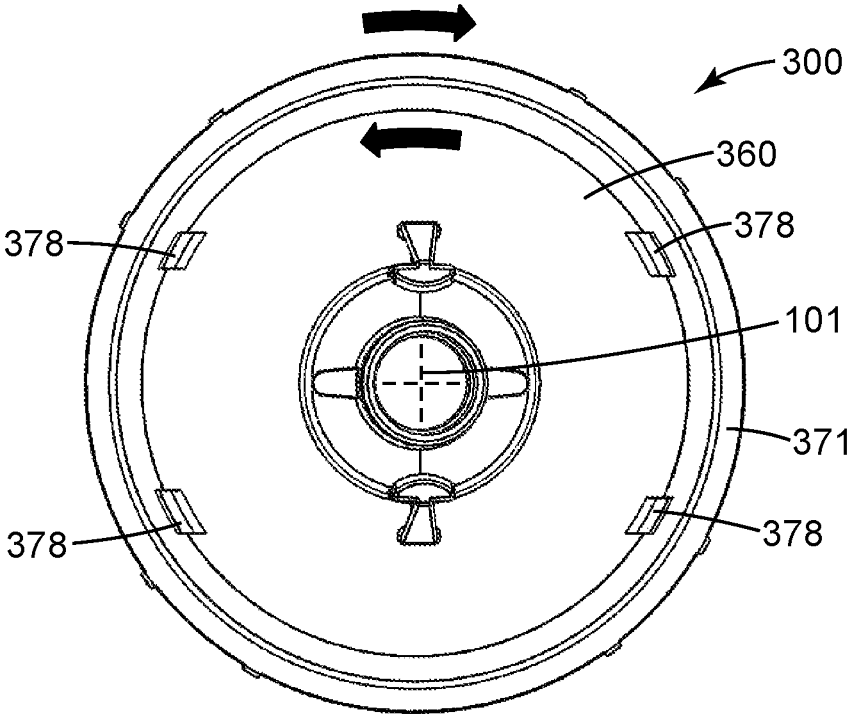
FIG. 16A is a top view of the lid of FIG. 16.
Figure 16B:
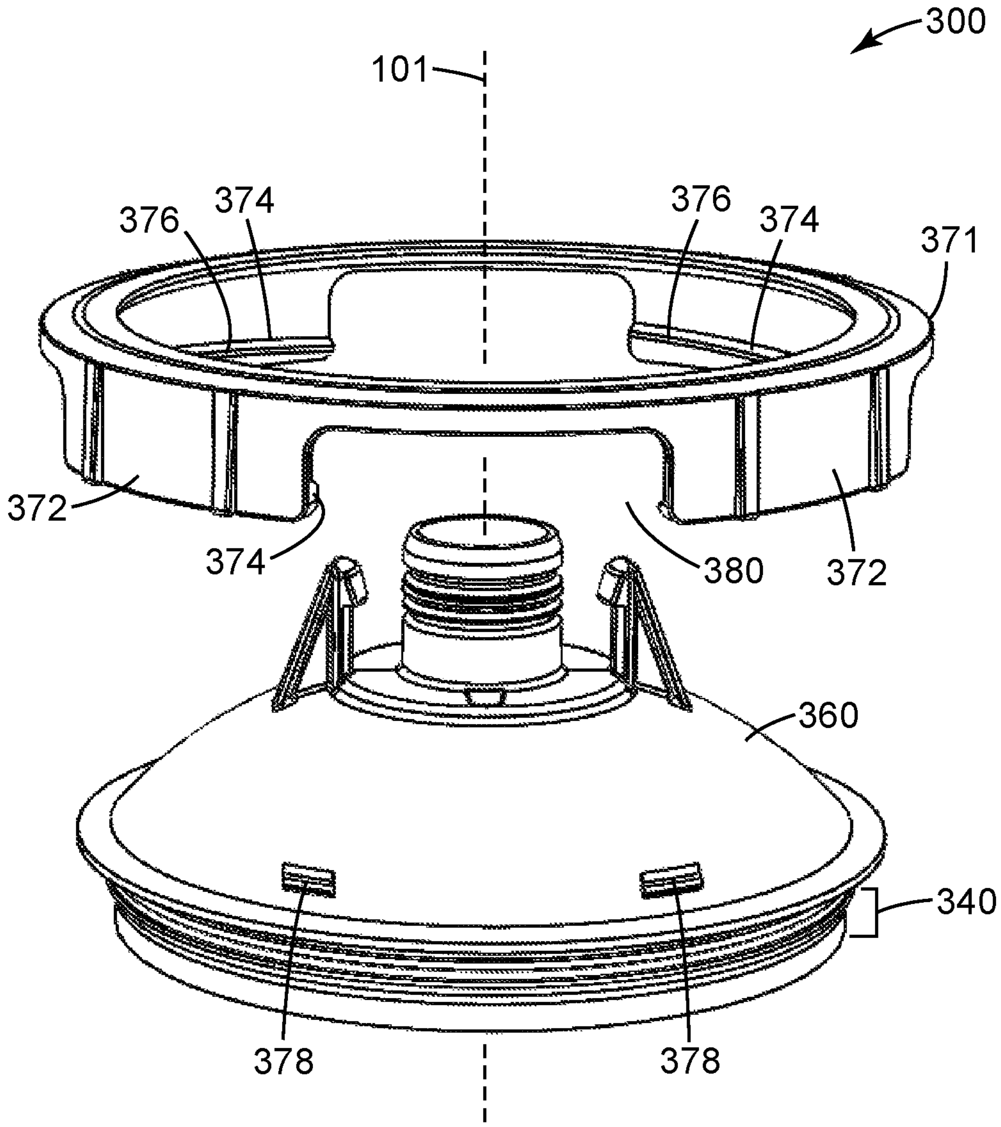
FIG. 16B is an exploded assembly view of the lid of FIG. 16.
Figure 16C:
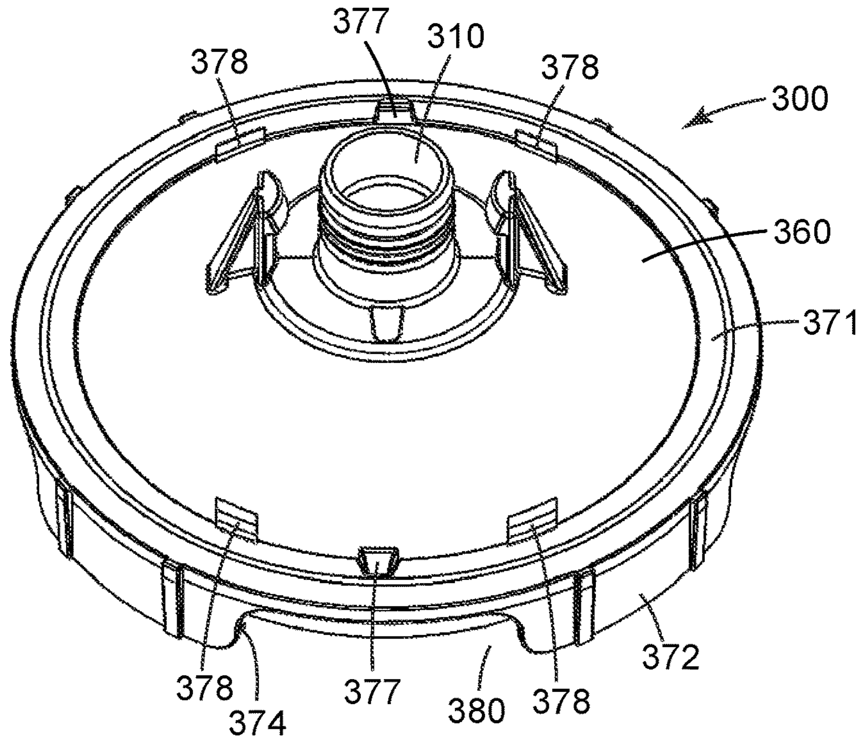
FIG. 16C is an isometric view of a lid as shown in FIGS. 16-16B additionally comprising a rotation limiting featured.
Figure 16D:
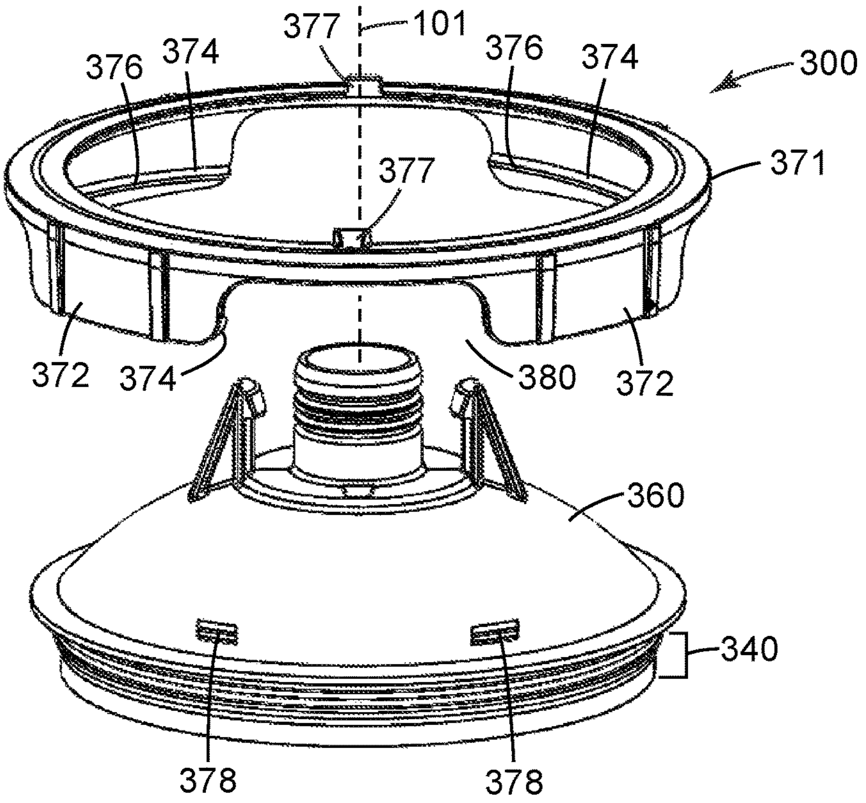
FIG. 16D in as exploded assembly view of the lid of FIG. 16C.

In some embodiments (see, e.g., FIGS. 11-14A), the flange 371 is formed integrally with the lid 300 (i.e., the lid body 360 and the flange 371 are integral). In other embodiments (see, e.g., FIGS. 15-16B), the flange 371 is initially formed independently of the lid body 360 and subsequently attached to form the competed lid 300. In such cases, the flange 371, after attachment to the lid body 360, may be configured to rotate relative to the lid body 360 (as in FIGS. 16-16B), or may be rotationally fixed relative to the lid body 360 (as in FIGS. 15-15B). When configured to rotate relative to the lid body 360, interaction of the flange 371 and the lid body 360 can permit the lid body 360 to remain in fixed sealing relation against the liner 200 and/or the spray gun cup receptacle 100 while the flange 371 is rotated to cause engagement of the lid connection structure 370 with the receptacle connection structure 170. Such relative movement can assist in both (i) providing a seal between the lid and liner and/or spray gun cup receptacle, and (ii) reducing the rotational force required to install the lid.

Where provided as a separate component, the flange 371 may be retained on the lid 300 via one or more flange retention features 378. Exemplary embodiments comprising flange retention features 378 are shown in FIGS. 15-16B. In the embodiment shown in FIGS. 15-15B, the flange 371 is rotationally fixed relative to the lid 300. In the embodiment shown in FIGS. 16-16B, the flange 371 is permitted to rotate relative to the lid 300. In some embodiments, rotation is permitted about a full three-hundred-sixty degrees about the central axis 101, while in others rotation may be limited to a partial turn such as, for example, ninety degrees. Where rotation is limited, a flange rotation limiting feature 377 may be provided on one or both of the lid body 360 and/or the flange 371 (see, e.g., FIGS. 16C and 16D. In this example, flange rotation limiting features 377 are provided on the flange 371 such that they will rotate through a predetermined arc until contact is made with a flange retention feature 378 on the lid body 360.

A separate flange 371 may be assembled in sealing relation with respect to the lid body 360, even if the flange 371 can rotate relative to the lid body 360 (e.g., by providing a sealing gasket, etc.). However, this is typically not necessary since the lid body 360 carries a liner sealing member (for example, on a skirt protruding from beneath the lid body as shown in in figures) and further comprises an inner lid body surface 361 that funnels paint to the liquid outlet. In other words, the lid body 361 forms a liquid conduit for the paint to flow from the liner into the spray gun such that a separate flange 371 can be movably connected to the lid body without worry of creating a leak path for paint.

In some embodiments, the liner 200 comprises a liner rim 212 surrounding the liner open end 210 that can provide additional sealing functionality when clamped between the lid 300 and the spray gun cup receptacle 100. In such embodiments, the lid 300 may be provided with a lid rim 312 and the spray gun cup receptacle 100 with a receptacle rim 112 surrounding the open end 110.

In such embodiments, it may be desirable that the camming surface 176—through interaction with a lid camming surface 376 on lid engagement members 374—enables a clamping force to be applied along the central axis 101 when the lid 300 is attached to the spray gun cup receptacle 100.

In such cases, one or both or the camming surface 176 and/or lid camming surface 376 is provided with geometry to cause relative clamping motion of the lid 300 and the receptacle along the central axis 101 during connection. In one embodiment, such geometry may be provided—at least in part—by an inclined or curved camming surface portion as described above on either or both the camming surface 176 and/or lid camming surface 376.

It will be further appreciated that while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that aspects of the present disclosure, as generally described herein and illustrated in the figures, can be arranged, substituted, combined, separated, and designed in a wide variety of different combinations, all of which are contemplated herein.

What is claimed is:

1. A method of installing a lid onto a spray gun cup receptacle comprising inserting a one-piece monolithic liner comprising a liner rim that forms an open end into an open end of the spray gun cup receptacle such that the liner rim rests within the open end of the spray gun cup receptacle, the liner comprises a release tab extending radially-outwardly from a central axis of the lid and from an outer circumference of the liner rim, the spray gun cup receptacle comprising a receptacle connection structure;

positioning the lid over the open end of the spray gun cup receptacle such that a lid connection structure on the lid is aligned with the receptacle connection structure, the lid connection structure comprises a lid rim, and at least two flange tabs each comprising a lid engagement member, the receptacle connection structure comprises an elongated protrusion configured to engage with the lid engagement member, a flange opening divides two flange tabs;

pushing the lid along the central axis into the open end of the liner to stretch the liner rim radially-outwardly around a liner sealing member on the lid; and after pushing the lid into the liner, engaging with the receptacle connection structure to lock the lid and liner in place against the spray gun cup receptacle, wherein the release tab fits within the flange opening when the liner is assembled with the lid and the release tab protrudes radially-outwardly beyond the lid rim.

2. The method of claim 1 wherein the pushing step comprises pushing the lid essentially into its final position in the liner prior to engaging the receptacle connection structure with the lid connection structure.

3. The method of claim 2 wherein the pushing step comprises pushing the lid rim into contact with the liner rim.

4. The method of claim 1 wherein an engaging step comprises engaging a camming surface on the spray gun cup receptacle with a lid camming surface to apply an attractive force along the central axis tending to draw the lid toward the spray gun cup receptacle.

5. The method of claim 1 further comprising removing the liner from the lid.

6. The method of claim 5 further comprising, prior to removing the liner from the lid, lifting the lid, together with the liner, from the spray gun cup receptacle.

7. The method of claim 5 wherein removing the liner from the lid comprises gripping the release tab on the liner to peel the liner from the liner sealing member.

8. The method of claim 1 further comprising disengaging the flange tab radially-outwardly to release the lid engagement member from the receptacle connection member; and lifting the lid from the spray gun cup receptacle.

9. The method of claim 1 wherein the engaging step comprises axially translating the flange tab toward the spray gun cup receptacle without rotation.

10. The method of claim 8 wherein disengaging the flange tab and lifting the lid from the spray gun cup receptacle does not require any rotation of the flange with respect to the spray gun cup receptacle.

* * * * *